United States Patent
Hamada et al.

(10) Patent No.: US 7,987,680 B2
(45) Date of Patent: Aug. 2, 2011

(54) AIR CONDITIONER

(75) Inventors: Mamoru Hamada, Kanagawa (JP);
Hiroki Igarashi, Kanagawa (JP);
Atsushi Itagaki, Kanagawa (JP);
Takafumi Arima, Kanagawa (JP);
Hiroaki Watanuki, Kanagawa (JP);
Yoshihiro Sasaki, Kanagawa (JP);
Masamitsu Usui, Kanagawa (JP)

(73) Assignee: Fujitsu General Limited, Kawasaki-shi (JP)

( * ) Notice: Subject to any disclaimer, the term of this patent is extended or adjusted under 35 U.S.C. 154(b) by 1264 days.

(21) Appl. No.: 11/545,634

(22) Filed: Oct. 11, 2006

(65) Prior Publication Data

US 2007/0079619 A1     Apr. 12, 2007

(30) Foreign Application Priority Data

Oct. 11, 2005 (JP) ................... 2005-296259
Feb. 28, 2006 (JP) ................... 2006-053398
Feb. 28, 2006 (JP) ................... 2006-053503
Feb. 28, 2006 (JP) ................... 2006-053570
Feb. 28, 2006 (JP) ................... 2006-053647

(51) Int. Cl.
*F25D 17/04* (2006.01)
*F25D 17/00* (2006.01)
*F24F 3/14* (2006.01)

(52) U.S. Cl. ............... 62/186; 62/93; 62/180; 236/44 A; 165/222

(58) Field of Classification Search ............... 62/186, 62/262, 180, 89, 91, 93; 236/44 R, 44 A; 165/222

See application file for complete search history.

(56) References Cited

U.S. PATENT DOCUMENTS

| 5,678,417 | A | * | 10/1997 | Nigo et al. ............... 62/186 |
| 7,594,539 | B2 | | 9/2009 | Isaka |
| 2004/0211553 | A1 | | 10/2004 | Hancock |
| 2004/0231834 | A1 | * | 11/2004 | Shibata et al. ............... 165/204 |
| 2007/0169927 | A1 | | 7/2007 | Isaka |

FOREIGN PATENT DOCUMENTS

| EP | 1 376 024 A1 | | 1/2004 |
| JP | 59-142343 A | | 8/1984 |
| JP | 61-59143 A | | 3/1986 |
| JP | 61059143 A | * | 3/1986 |
| JP | 3-105129 A | | 5/1991 |
| JP | 06 337150 A | | 12/1994 |
| JP | 7-248125 A | | 9/1995 |
| JP | 10 019340 A | | 1/1998 |
| JP | 11-325550 A | | 11/1999 |
| JP | 2000-009235 A | | 1/2000 |

(Continued)

*Primary Examiner* — Chen-Wen Jiang
(74) *Attorney, Agent, or Firm* — Venable LLP; Michael A. Sartori; Steven J. Schwarz

(57) ABSTRACT

Between two heat exchangers of a first heat exchanger unit 41 and a second heat exchanger unit 42 included in an indoor heat exchanger 40, an opening 80 is arranged for introducing indoor air sucked from an air inlet 321 into an indoor blower 50 without being heat-exchanged. At the opening 80, a damper 91 is arranged for adjusting the opening rate of the opening 80, which is driven by a predetermined driving member 92. During a cooling cycle running of a freezing cycle, the opening rate of the opening 80 and/or the devices included in the freezing cycle such as a compressor, blower and expansion valve are controlled alone or in combination so that the temperature of the indoor heat exchanger 40 is lower than a dew point temperature of the indoor air.

37 Claims, 15 Drawing Sheets

FOREIGN PATENT DOCUMENTS

| | | |
|---|---|---|
| JP | 2000 039168 A | 2/2000 |
| JP | 2000-88327 | 3/2000 |
| JP | 2002-061863 A | 2/2002 |
| JP | 2003-106619 A | 4/2003 |
| JP | 2003-254555 A | 9/2003 |
| JP | 2004-361023 A | 12/2004 |
| JP | 2005-233494 A | 9/2005 |
| JP | 2005-273923 A | 10/2005 |

* cited by examiner

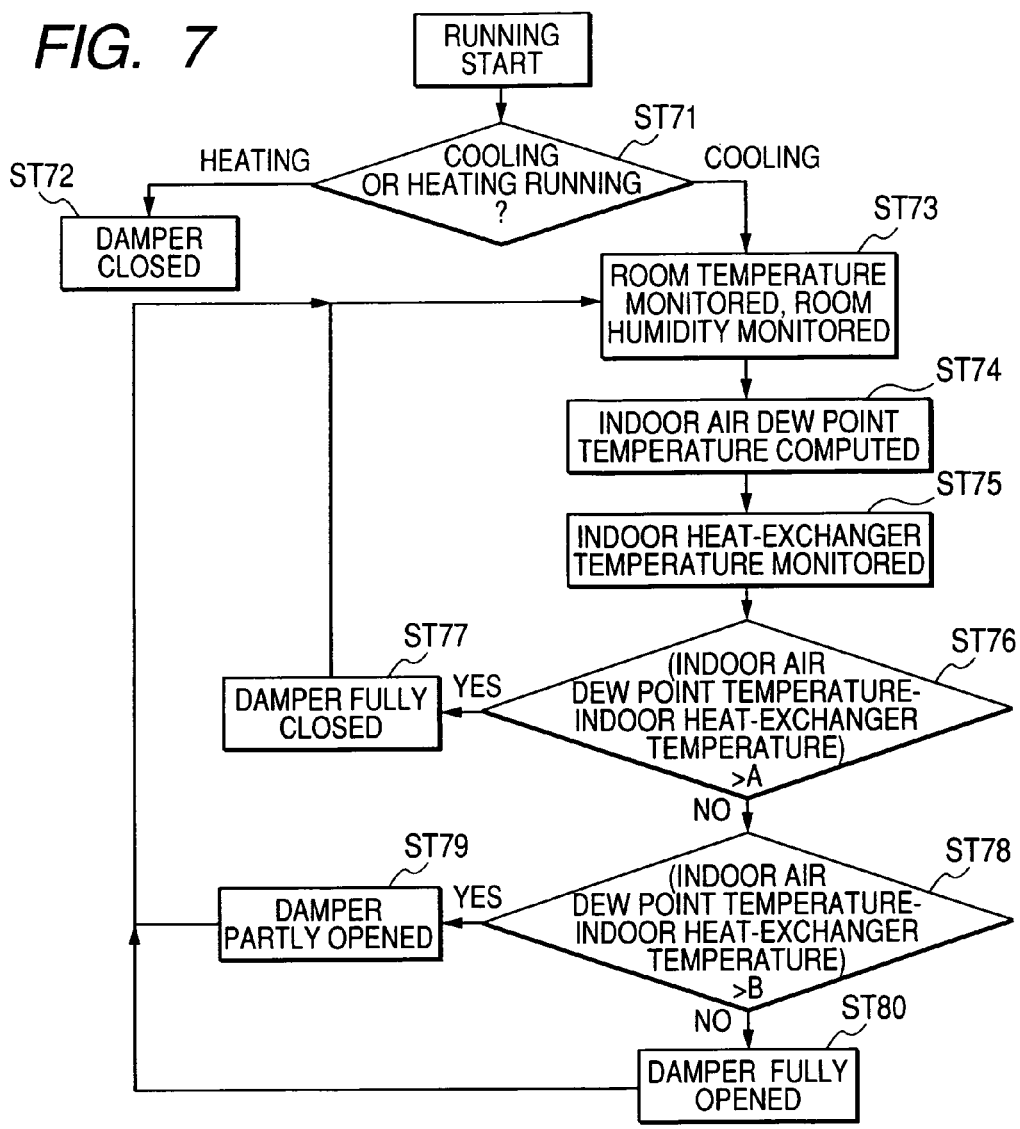

AIR CONDITIONER

BACKGROUND OF THE INVENTION

This invention relates to an air conditioner, and more specifically to a technique for changing a ratio between latent heat and sensible heat in an indoor heat exchanger during running of a cooling cycle, thereby improving capability of dehumidification (latent heat).

An air conditioner in a cooling/heating system has a freezing cycle including a compressor, a four-way valve, an outdoor heat exchanger, an expansion valve and an indoor heat exchanger. During a heating operation, the air conditioner circulates coolant in the course of the compressor→four-way valve→indoor heat exchanger→expansion valve→outdoor heat exchanger→four-way valve→compressor and employs the indoor heat exchanger as a condenser and the outdoor heat exchanger as an evaporator.

On the other hand, during a cooling operation inclusive of dehumidification, the air conditioner circulates the coolant in the course of compressor→four-way valve→outdoor heat exchanger→expansion valve→indoor heat exchanger→four-way valve→compressor, and employs the indoor heat exchanger as the evaporator and the outdoor heat exchanger as the condenser. During the humidification, weak running of the cooling running ("simple cooling operation") is executed. Meanwhile, during this cooling/dehumidification operation, if the temperature of the indoor heat exchanger has not reached a dew point temperature, the room temperature only falls and the indoor relative humidity rises. So, an unpleasant feeling may be given to users.

Specifically, since the changing rate of latent heat is low as compared with the changing rate of sensible heat by the indoor heat exchanger, the sensible heat is exhibited alone so that owing to the resultant reduction in the room temperature, the relative humidity rises to nearly 100%. Thus, a chilling sense will be given to the users. In recent years, for the purpose of energy saving, an increase in the quantity of wind has been intended. However, with an increase in the quantity of wind, the temperature in the indoor heat exchanger rises and the capability of dehumidification is sacrificed.

In order that the chilling sense is not given to the users during the cooling/dehumidification operation, a proposal of rising the temperature of the air discharged from an indoor unit is described in e.g. Patent Reference 1. In the invention described in Patent Reference 1, a part of the indoor air sucked into an indoor unit is passed through the indoor heat exchanger to create a cold wind at 12 to 15° C. On the other hand, the remaining air is caused to bypass the indoor heat exchanger and is mixed with the cold wind cooled to 12 to 15° C. by the indoor heat exchanger in a mixing chamber in front of the air outlet. The mixed wind is discharged from the air outlet.

Patent Reference 1: JP-A-2000-88327

In accordance with the invention described in Patent Reference 1, the temperature of the discharged air can be set at 20 to 25° C. which does not give a sense of the cold wind. However, in the invention in Patent Reference 1, there are not disclosed a technique for increasing the quantity of dehumidification when a damper is opened/closed for bypassing the indoor heat exchanger, timings of opening the damper, a countermeasure when the damper has caused a failure and a technique for preventing condensation in the indoor blower.

SUMMARY OF THE INVENTION

Accordingly, an object of this invention is to raise the temperature of discharged air by opening/closing the damper at appropriate timings and enhance the capability of dehumidification during a cooling/defumidifying operation, to prevent an indoor environment from being deteriorated particularly when the damper is broken down in enhancing the capability of dehumidification and to prevent condensation in an indoor blower due to introduced air (raw gas) in enhancing the capability of dehumidification during a cooling/defumidifying operation, thereby to improve the degree of comfort.

In order to solve the above problem, according to the claim 1, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

an outdoor blower; and a controller for controlling a freezing cycle including at least the indoor heat exchanger, a compressor and a flow rate adjuster and the indoor blower, wherein the indoor heat exchanger includes at least two heat exchangers of a first heat exchanger and a second heat exchanger and an introducing member for introducing the indoor air sucked from the air inlet into the indoor blower without being heat-exchanged, the introducing member being located between the first and the second heat exchanger; and the controller, during a cooling cycle running of the freezing cycle, controls alone or in combination the quantity of air introduced from the introducing member and/or any one of the indoor blower and the devices included in the freezing cycle such as the flow adjuster so that the temperature of the indoor heat exchanger is lower than a dew point temperature of the indoor air.

According to the claim 2, there is provided the air conditioner according to claim 1, wherein the introducing member includes:

an opening located between the first and the heat exchanger; and a damper for adjusting the opening rate of the opening which is driven by a predetermined driving member.

According to the claim 3, there is provided the air conditioner according to claim 1, wherein the introducing member includes:

a duct having an air inlet mouth for directly introducing the indoor air and/or outdoor air without being passed through the indoor heat exchanger, and an air outlet mouth for discharging the air introduced from the air inlet mouth toward the indoor blower; and a damper for adjusting the air flow rate within the duct.

According to the claim 4, there is provided the air conditioner according to any one of claims 1 to 3, wherein the first and the second heat exchanger are arranged along the periphery on the side of the air inlet of the indoor blower, and the introducing member is arranged at a position farthest in distance from the indoor blower.

According to the claim 5, there is provided the air conditioner according to any one of claims 1 to 4, wherein the air flow passing the first and the second heat exchanger to reach the indoor blower, and the air flow passing the introducing member to reach the indoor blower cross at an angle of 30° or more.

According to the claim 6, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

an outdoor blower;

a controller for controlling a freezing cycle including at least the indoor heat exchanger, a compressor and a flow rate adjuster and the indoor blower;

a duct provided within the housing, the duct having an air inlet mouth for directly introducing the indoor air and/or outdoor air without being passed through the indoor heat exchanger and an air outlet mouth for discharging the air introduced from the air inlet mouth toward the indoor blower; and at at least one opening of the air inlet mouth and the air outlet mouth, a damper for adjusting the opening rate of the opening is provided whose opening/closing is controlled by the controller, wherein during a cooling cycle running of the freezing cycle, the controller controls alone or in combination the opening rate of the opening and/or any one of the indoor blower and the devices included in the freezing cycle such as the flow adjuster so that the temperature of the indoor heat exchanger is lower than a dew point temperature of the indoor air.

According to the claim 7, there is provided the air conditioner according to any one of claims 2 to 6, wherein when the opening rate of the opening is increased by the damper, the controller increases the number of revolutions of the compressor included in the freezing cycle according to a predetermined condition.

According to the claim 8, there is provided the air conditioner according to any one of claims 2 to 7, further including:

a temperature sensor for detecting a room temperature Tr, wherein the controller drives the damper by the driving member according to a temperature difference (Tr−Ts) between the room temperature Tr and a set temperature Ts to adjust the opening rate of the opening.

According to the claim 9, there is provided the air conditioner according to claim 8, wherein a plurality of threshold values are set for the temperature difference (Tr−Ts) and the damper is driven by the driving member on the basis of a value relationship between the temperature difference (Tr−Ts) and each of the threshold values to adjust the opening rate of the opening.

According to the claim 10, there is provided the air conditioner according to any one of claims 2 to 7, further including:

a humidity sensor for detecting humidity RH of the indoor air, wherein the controller drives the damper by the driving member according to the humidity RH to adjust the opening rate of the opening.

According to the claim 11, there is provided the air conditioner according to claim 10, wherein a plurality of threshold values are set for the humidity RH and the damper is driven by the driving member on the basis of a value relationship between the humidity RH and each of the threshold values to adjust the opening rate of the opening.

According to the claim 12, there is provided the air conditioner according to any one of claims 2 to 7, further including:

a first temperature sensor for detecting a room temperature Tr;

a humidity sensor for detecting humidity RH of the indoor air; and a second temperature sensor for detecting a temperature Te of the indoor heat exchanger, wherein the controller computes a dew point temperature Tw from the room temperature Tr and the humidity RH, and drives the damper by the driving member according to a temperature difference (Tw−Te) between the dew point temperature Tw and the temperature Te of the indoor heat exchanger to adjust the opening rate of the opening.

According to the claim 13, there is provided the air conditioner according to claim 12, wherein a plurality of threshold values are set for the temperature difference (Tw−Te), and the damper is driven by the driving member on the basis of a value relationship between the temperature difference (Tw−Te) and each of the threshold values to adjust the opening rate of the opening in multiple stages.

In order to solve the above problem, according to the claim 28, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein when the damper is shifted from "opened" to "closed" and vice versa as a result that a prescribed damper opening condition or damper closing condition is satisfied, the controller keeps the damper in a shifted status for a subsequent predetermined time.

According to the claim 29, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein when a damper opening condition or a damper closing condition is successively detected over plural times every time intervals, the controller places the damper in an opened status or closed status.

According to the claim 30, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein the controller has a temperature-setting priority mode of causing a room temperature to arrive at a set temperature precedently to other controls, and keeps the damper in a closed status during the temperature-setting priority mode.

According to the claim 31, there is provided the air conditioner according to claim 30, wherein the temperature-setting priority mode is set by a remote controller.

According to the claim 32, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein when the damper is opened, the controller makes the number of revolutions of the indoor blower smaller than that when the damper is closed.

According to the claim 33, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein as a mode of the number of revolutions of the indoor blower, the controller has at least three modes of the number of revolutions including the number of revolutions R1 when the damper is closed, the number of revolutions R2 (<R1) when the damper is opened, and the number of revolutions R3 (<R2) before the damper is opened, and when the damper is shifted from "closed" to "opened" as a result that a prescribed opening condition is satisfied, executed are a first step of changing the number of revolutions of the indoor blower from R1 to R3;

a second step of keeping the number of revolutions R3 for a predetermined time;

a third step of placing the damper in a closed status after the second step; and a fourth step of changing the number of revolutions of the indoor blower from R3 to R2, when the damper comes to a prescribed opening position.

In order to solve the above problem, according to the claim 34, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and a compressor and the indoor blower;

a raw gas introducing portion for introducing a raw gas of indoor air and/or outdoor air into the indoor blower without passing through the indoor heat exchanger; and a damper for opening/closing the raw gas introducing portion under the control by the controller during a cooling cycle running of the freezing cycle, wherein the cooling cycle running is continued, even when the damper is unusual in operation.

According to the claim 35, there is provided the air conditioner according to claim 34, wherein as a mode of the number of revolutions of the compressor, the controller has at least two modes of the number of revolutions including the number of revolutions P1 when the damper is closed and the number of revolutions P2 ($\leqq$P1) when the damper is opened, and when the damper is unusual in operation, the number of revolutions of the compressor is set at the number of revolutions P2.

According to the claim 36, there is provided the air conditioner according to claim 34 or 35, wherein when the damper is unusual in operation, the controller makes an error indication by operating a predetermined noticing member.

According to the claim 37, there is provided an air conditioner including:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle including at least the indoor heat exchanger and the indoor blower;

a raw gas introducing portion for introducing a raw gas of indoor air and/or outdoor air into the indoor blower without passing the indoor heat exchanger, wherein the raw gas introducing portion is arranged between two units of the indoor heat exchanger, and of coolant flow passages of each unit of the indoor heat exchanger, the coolant passages located on the downstream side in a flowing direction of sucked air are connected to each other so as to straddle the raw gas introducing portion.

In accordance with the invention described in claim 1, between the two heat exchanger units of the first and the second heat exchanger unit, an introducing member is provided for introducing the indoor air sucked from the air inlet into the indoor blower without being heat-exchanged; and during a cooling cycle running of the freezing cycle, the quantity of air introduced from the introducing member and/or any one of the outdoor blower and the devices included in the freezing cycle such as the flow adjuster are controlled alone or in combination so that the temperature of the indoor heat exchanger is lower than a dew point temperature of the indoor air. In this way, according to an indoor environment, both dehumification capability and the temperature of blowing air can be enhanced, thereby making the indoor environment comfortable.

In accordance with the invention described in claim 2 wherein the introducing member includes an opening located between the first and the heat exchanger and a damper for adjusting the opening rate of the opening which is driven by a predetermined driving member, the quantity of introduced air can be easily adjusted by the damper.

In accordance with the invention described in claim 3 wherein the introducing member includes a duct having an air inlet mouth for directly introducing the indoor air and/or outdoor air without being passed through the indoor heat exchanger and an air outlet mouth for discharging the air introduced from the air inlet mouth toward the indoor blower; and a damper for adjusting the quantity of the air flowing within the duct, like the invention described in claim 2, the quantity of introduced air can be easily adjusted by the damper.

In accordance with the invention described in claim 4, wherein the first and the second heat exchanger are arranged along the periphery on the side of the air inlet of the indoor blower and the introducing is arranged at a position farthest in distance from the indoor blower, the mixing of the air passing each the heat exchanger units and the air flowed in from the opening is promoted before the indoor blower so that condensation for the indoor blower can be reduced more greatly.

In accordance with the invention described in claim 5 wherein the air flow passing the first and the second heat exchanger to reach the indoor blower and the air flow passing the introducing member to reach the indoor blower cross at an angle of 30° or more, the mixing of the air passing each the heat exchanger units and the air flowed in from the opening is promoted before the indoor blower so that condensation for the indoor blower can be reduced more greatly, like the invention described in claim 2.

Further, in accordance with the invention described in claim 6, since the indoor air and/or outdoor air (raw gas) is introduced into the housing by the duct, the freedom of design in arranging the raw gas introducing portion within the housing can be enhanced.

In accordance with the invention described in claim 7 wherein when the opening rate of the opening is increased by the damper, the number of revolutions of the compressor included in the freezing cycle is increased according to a predetermined condition, the rate of the sensible heat/latent heat in the indoor heat exchanger can be changed without changing the cooling capability.

In accordance with the invention described in claim 8 wherein the damper is driven by the driving member according to a temperature difference (Tr−Ts) between the room temperature Tr and a set temperature Ts, thereby adjusting the opening rate of the opening, and invention described in claim 9 wherein a plurality of threshold values are set for the temperature difference (Tr−Ts) and the damper is driven by the driving member on the basis of a value relationship between the temperature difference (Tr−Ts) and each of the threshold values, thereby adjusting the opening rate of the opening in multiple stages, the rate of the sensible heat/latent heat in the indoor heat exchanger can be optimized according to a temperature difference (Tr−Ts) between the room temperature Tr and set temperature Ts.

In accordance with the invention described in claim 10 wherein the damper is driven by the driving member according to the humidity RH, thereby adjusting the opening rate of the opening, and the invention described in claim 11 wherein a plurality of threshold values are set for the humidity and the damper is driven by the driving member on the basis of a value relationship between the humidity RH and each of the threshold values, thereby adjusting the opening rate of the opening in multiple stages, the rate of the sensible heat/latent heat in the indoor heat exchanger can be optimized according to the humidity RH.

In accordance with the invention described in claim 12 wherein the damper is driven by the driving member according to according to a temperature difference (Tw−Te) between the dew point temperature Tw and the temperature Te of the indoor heat exchanger, thereby adjusting the opening rate of the opening, and the invention described in claim 13 wherein a plurality of threshold values are set for the temperature difference (Tw−Te), and the damper is driven by the driving member on the basis of a value relationship between the temperature difference (Tw−Te) and each of the threshold values, thereby adjusting the opening rate of the opening in multiple stages, the rate of the sensible heat/latent heat in the indoor heat exchanger can be optimized according to the dew point temperature Tw.

In accordance with the invention described in claim 28, where the damper is opened/closed on the basis of a control factor such as a room temperature, humidity and dew point temperature, when the damper is shifted from "closed" to "opened" and vice versa, the damper is kept in a shifted status for a subsequent prescribed time. For this reason, even the control factor fluctuates, the damper is not frequently opened/closed (prevention of chattering).

In accordance with the invention described in claim 29, where a damper opening condition or a damper closing condition is successively detected over plural times every time intervals, the damper is placed in an opened status or closed status. Thus, control with high reliability can be executed.

In accordance with the invention described in claim 30, during the temperature-setting priority mode of causing a room temperature to arrive at a set temperature precedently to other controls, even if the damper opening condition is satisfied, until a difference between the room temperature and a set temperature becomes a predetermined value or less, the damper is kept in a closed status. Thus, the capability of sensible heat is enhanced, thereby permitting the room temperature to arrive at the set temperature in a short time.

In accordance with the invention described in claim 31, the temperature-setting priority mode can be set using a remote controller, the running according to user' requests can be executed.

In accordance with the invention described in claim 32, when the damper is opened, the number of revolutions of the indoor blower is made smaller than that when the damper is closed. Thus, noise occurrence due to an increase in the quantity of wind when the damper is opened can be prevented.

In accordance with the invention described in claim 33, as a mode of the number of revolutions of the indoor blower, prepared are at least three modes of the number of revolutions including the number of revolutions R1 when the damper is closed, the number of revolutions R2 (<R1) when the damper is opened, and the number of revolutions R3 (<R2) before the damper is opened. Where the damper is shifted from "closed" to "opened" as a result that a prescribed opening condition is satisfied, after the number of revolutions of the indoor blower is changed from R1 to R3, the number of revolutions R3 is kept for a predetermined time and thereafter the damper in a closed status; and the number of revolutions of the indoor blower is changed from R3 to R2. In this way, the damper can be opened in a quiet status.

In accordance with the invention described in claim 34, even when the damper is unusual in operation, the cooling cycle running is continued so that an unpleasant feeling due to stopping of the running is not given to a user.

In accordance with the invention described in claim 35, as a mode of the number of revolutions of the compressor, prepared are the controller has at least two modes of the number of revolutions including the number of revolutions P1 when the damper is closed and the number of revolutions P2 ($\leq$P1) when the damper is opened, and when the damper is unusual in operation, the number of revolutions of the compressor is set at the number of revolutions P2. Thus, even if the running is continued for a long time with the damper being unusual in operation (for example, being opened), the interior of the housing can be made difficult to be condensed.

In accordance with the invention described in claim 36, when the damper is unusual in operation, an error indication is made by operating a predetermined noticing member. So, the user can know that the present running is running with the damper being unusual in operation and can take a swift countermeasure.

In accordance with the invention descried in claim 37, where the raw gas introducing portion is arranged between two units of the indoor heat exchanger, the coolant passages located on the downstream side of each unit of the indoor heat exchanger are connected to each other so as to straddle the raw gas introducing portion. Thus, the introduced raw gas is nearly equally cooled by the coolant flow passages on the downstream side of the one indoor heat exchanger unit and the other indoor heat exchanger unit, thereby reducing changes in temperature more greatly.

BRIEF DESCRIPTION OF THE DRAWINGS

FIG. 7 is a flowchart of a third exemplary control operation according to this invention.

FIG. 8 is a view for explaining a dew point temperature control band in the third exemplary control operation.

DETAILED DESCRIPTION OF THE PREFERRED EMBODIMENTS

Now, referring to FIGS. 1 to 8, an explanation will be given of a basic embodiment of this invention.

Figure 1:
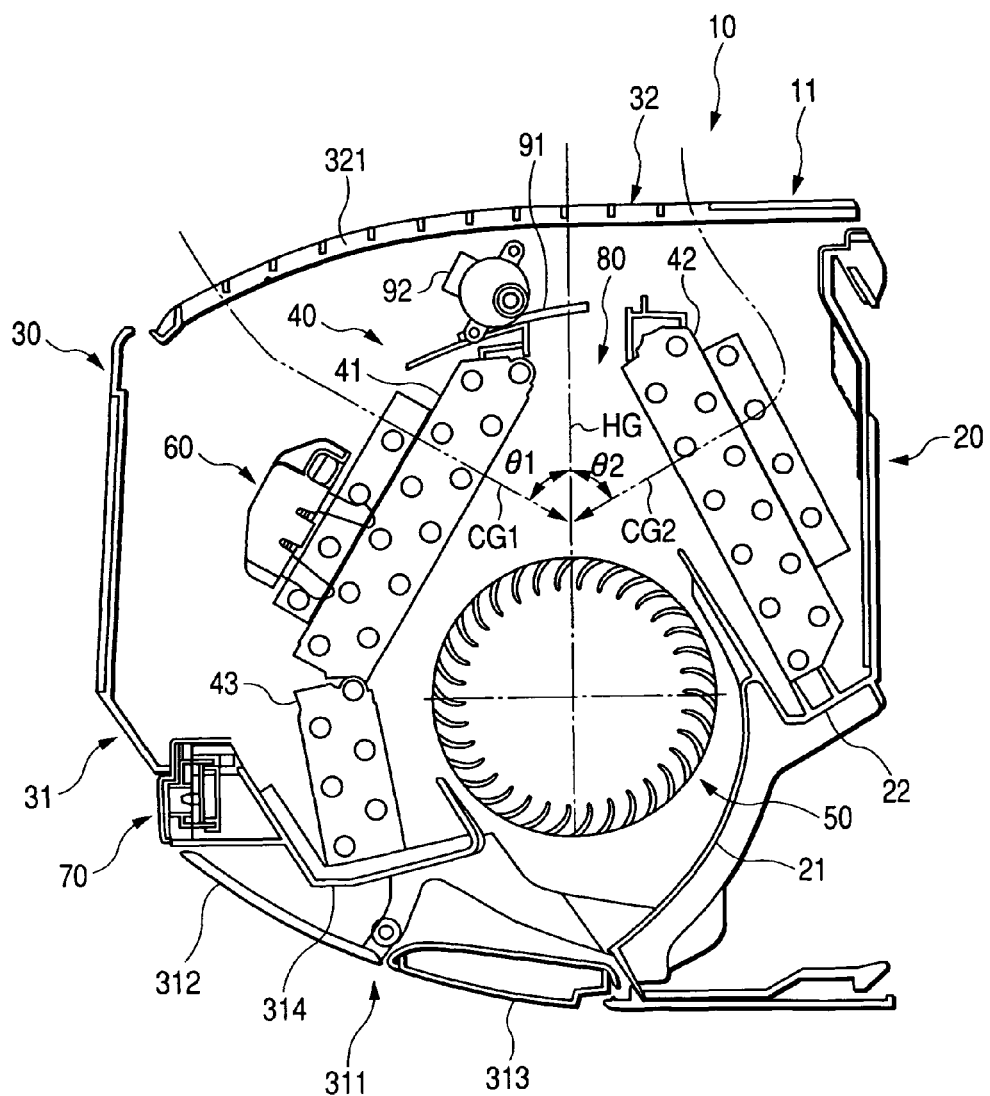
FIG. 1 is a sectional view of an internal structure of an indoor unit of an air conditioner according to this invention.
Figure 2:
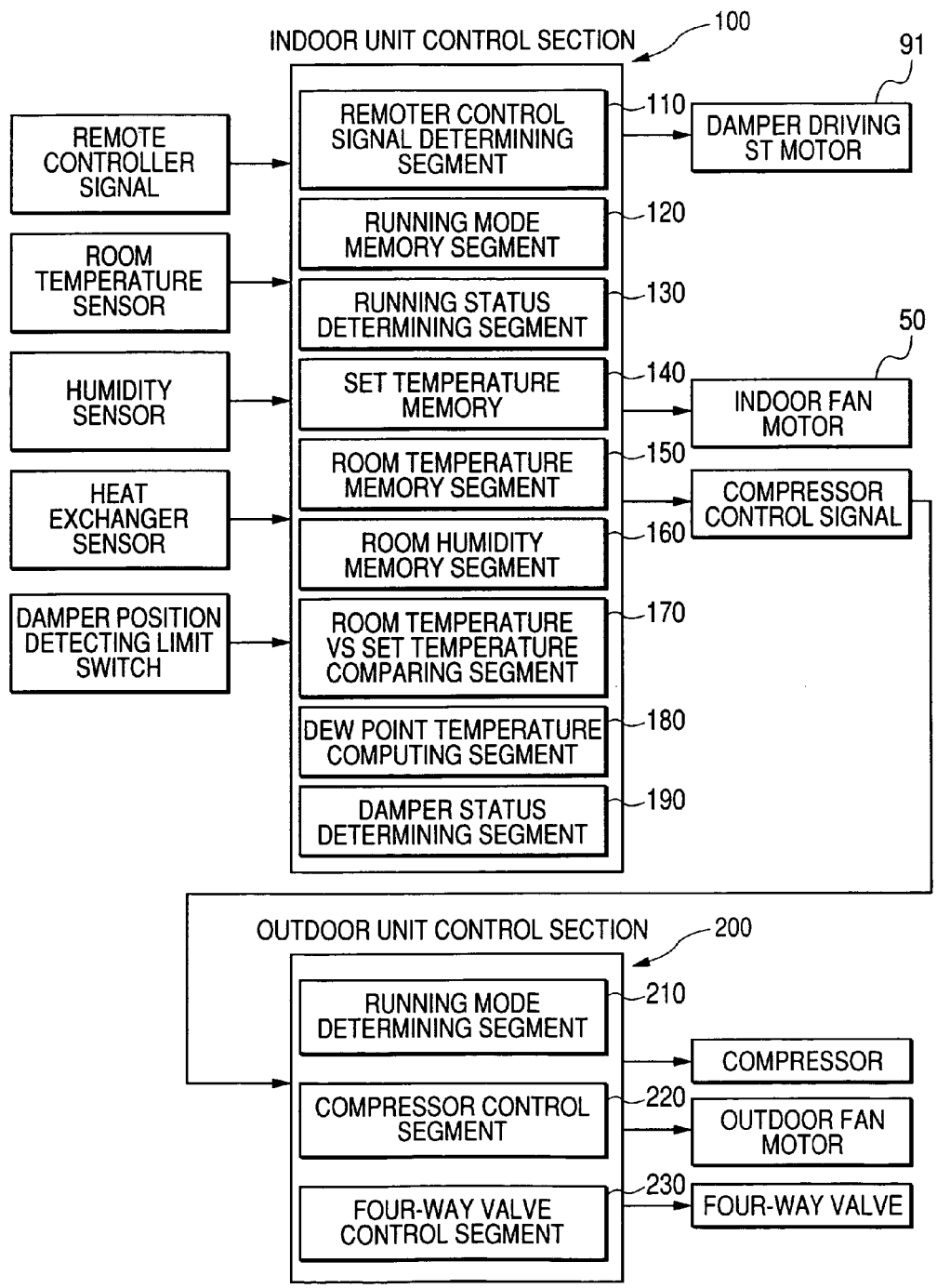
FIG. 2 is a block diagram of a control system according to this invention.
Figure 3:
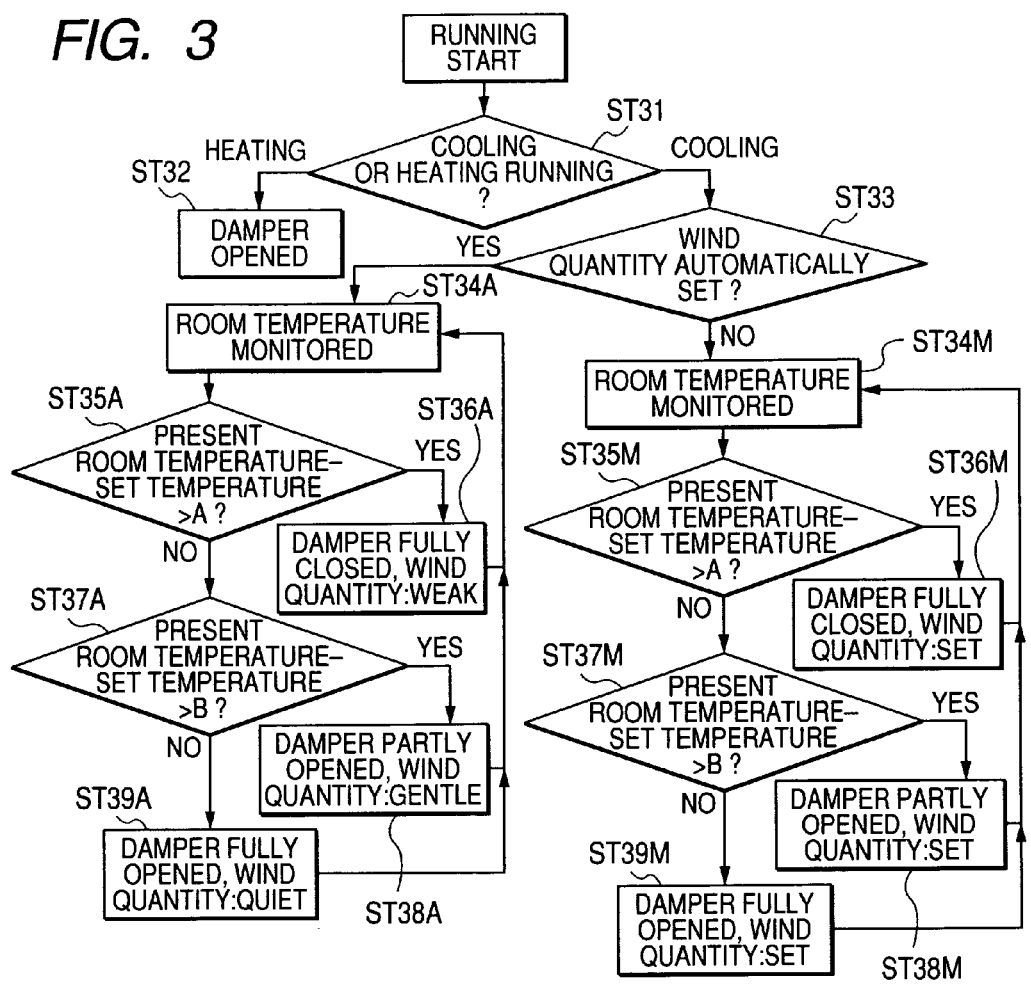
FIG. 3 is a flowchart of a first exemplary control operation according to this invention.
Figure 4:
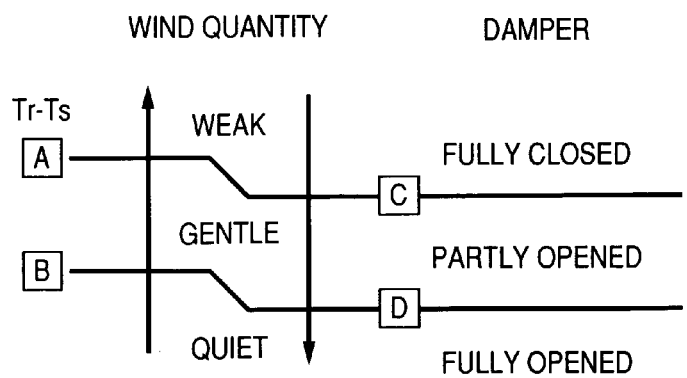
FIG. 4 is a view for explaining a temperature control band in the above first exemplary control operation.
Figure 5:
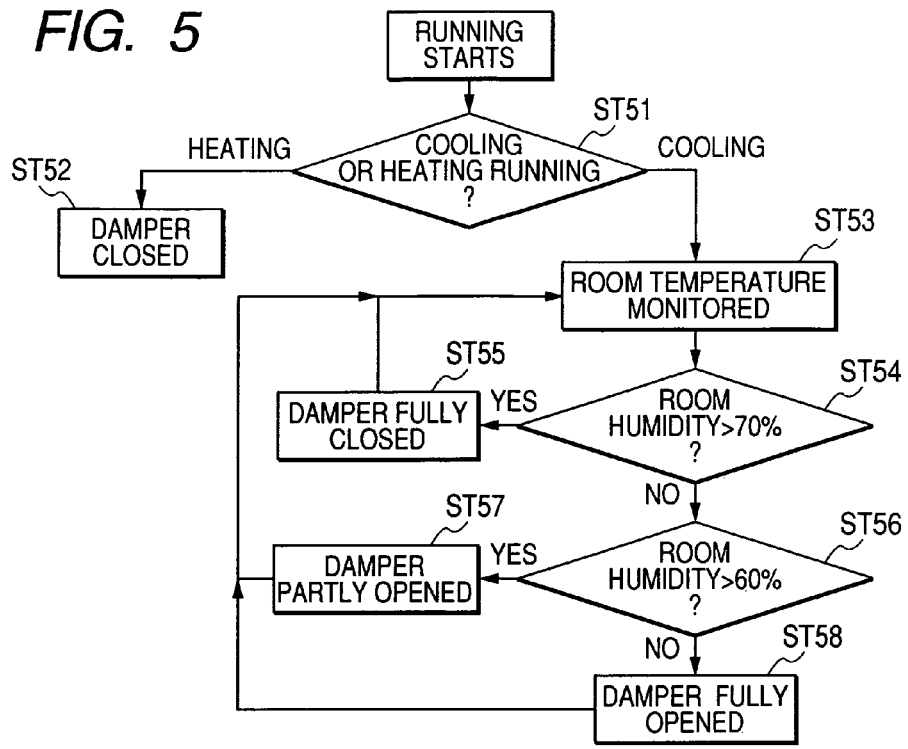
FIG. 5 is a flowchart of a second exemplary control operation according to this invention.
Figure 6:
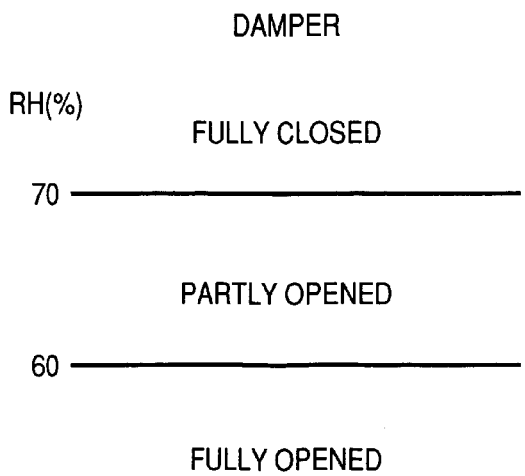
FIG. 6 is a view for explaining a humidity control band in the second exemplary control operation.

FIG. 1 is a sectional view of an internal structure of an indoor unit of an air conditioner according to this invention. FIG. 2 is a block diagram of a control system according to this invention. FIGS. 3 and 4 are a flowchart of a first exemplary control operation according to this invention and a view for explaining a temperature control band, respectively. FIGS. 5 and 6 are a flowchart of a second exemplary control operation according to this invention and a view for explaining a humidity control band, respectively. FIGS. 7 and 8 are a flowchart of a third exemplary control operation according to this invention and a view for explaining a dew point temperature control band, respectively.

The air conditioner according to this invention includes an indoor unit 10 as seen from FIG. 1. In this embodiment, the indoor unit 10 has a wall-mounted housing (enclosure) 11 incorporating a base plate 20 attached to the wall of a room and an exterior panel 30 supported by the base plate 20.

In this embodiment, the exterior panel 30 includes a panel body 31 covering the area extending from the bottom face to the front face of the indoor unit 10 and an upper panel 32 covering the upper face. On the side of the bottom face of the panel body 31, an air outlet 311 is provided. The upper panel 32 is constructed of a grill panel having an air inlet 321.

The air outlet 311 includes a vertical wind-direction plate 312 and a diffuser plate 313 which is opened during rapid heating or rapid cooling. Two wind-direction plates 312 are substituted for the diffuser plate 313.

Further, the air outlet 311 may include a horizontal wind-direction plate (not shown). On the inner face of the air inlet 321 of the upper panel 32, an air filter (not shown) is attached. Also on the front face of the panel body 31, the air inlet may be formed.

Within the housing 11, in an air passage from the air inlet 321 of the upper panel 32 to the air outlet 311 of the panel body 31, an indoor heat exchanger 40 and an indoor blower (indoor fan) 50 are arranged. The indoor heat exchanger 40 and the indoor blower 50 are supported by side plates (not shown) provided at both ends of the base plate 20. Usually, the indoor blower 50 may be a cross-flow fan.

The indoor heat exchanger 40 includes at least two separated heat-exchanger units of a first heat exchanger unit 41 located on the front face side of the panel body 31 and a second heat exchanger unit 42 located on the rear face side of the pane body 31.

The first heat exchanger unit 41 and the second heat exchanger unit 42 are combined in a Λ-shape and arranged along the periphery on the air inlet side of the indoor blower 50. However, as in this embodiment, a third heat exchanger unit 43 may be further arranged below the first heat exchanger unit 41.

On the inner face side of the panel body 31, a drain pan 314 is formed to receive condensed dew which drops from the first heat exchanger unit 41 and the third heat exchanger unit 43. On the other hand, the base plate 20 is provided with a blower guide plate 21 which forms a blower passage from the indoor blower 50 to the air outlet 311 between itself and the bottom of the drain pan 314. The blower guide plate 21 is provided with a drain pan 22 for the second heat exchanger unit 42.

Additionally, in this embodiment, the first heat exchanger unit 41 is provided with an electric dust collector 60. A console box 70 is attached to the front face of the panel body 31. The console box 70 accommodates a circuit board in which a light receiving element for receiving an infrared remote-controller signal, an indicator for indicating e.g. a running mode and room temperature, etc. are mounted.

Although not shown, within the housing 11, provided are a room temperature sensor for detecting the temperature of an indoor air (room temperature), a humidity sensor for detecting the relative humidity of the indoor air, and a heat exchanger temperature sensor for detecting the temperature of the indoor heat exchanger sensor 40. The room temperature sensor and the humidity sensor are preferably arranged on the side of the air inlet of the indoor heat exchanger sensor 40.

In accordance with this invention, at a part of the indoor heat exchanger 40, provided are an opening 80 for directly introducing the indoor air (also referred to as raw gas) without being heat-exchanged and a damper 91 for adjusting the opening rate of the opening 80. These members are provided in order to enhance the dehumidification capability due to latent heat during the cooling cycle running inclusive of the weak cooling running during the dehumidification and also to raise the discharged air during the cooling cycle running.

In this embodiment, the opening 80 is formed between the respective upper ends of the first heat exchanger unit 41 and the second heat exchanger unit 42. Further, the damper 91 is a sliding type and driven by a pinion-rack mechanism by a motor 92. The motor 92 may be preferably a stepping motor. Unlike this embodiment, the damper 91 may be a rotating type.

By opening the damper 91 to introduce the raw gas from the opening 80, the quantity of air passing through the indoor heat exchanger 40 is correspondingly reduced and also the speed of the passing wind is decreased. As a result, the temperature of the indoor heat exchanger 40 is kept at a lower temperature than the dew point temperature of the indoor air so that a difference between the dew point temperature of the indoor air and the heat exchanging temperature of the indoor heat exchanger 40 is increased, thereby enhancing the dehumidification (latent heat) capability. Further, by introducing the raw gas, the temperature of the air discharged from the air outlet 311 is raised so that the chilling sense which was problematic during the cooling/dehumidifying operation can be cancelled.

Additionally, under a certain temperature condition, without changing the number of revolutions of the indoor blower 50 or that of the compressor, the temperature of the indoor heat exchanger 40 can be kept at a lower temperature than the dew point temperature of the indoor air. However, by changing the number of revolutions of the indoor blower 50 and/or that of the compressor or the stopping degree of an expansion valve included in the freezing cycle thereof, the temperature of the heat exchanger 40 may be set at the lower temperature than the dew point temperature of the indoor air.

On the other hand, by introducing the raw gas from the opening 80, it is possible to make it difficult to generate condensation in the indoor blower 50. Specifically, the condensation in the indoor blower 50 occurs when the air having a high dew point temperature touches the indoor blower cooled by the cold air supplied from the heat exchanger. In the case of this invention, the raw gas introduced from the opening 80 is mixed with the cold air supplied from the indoor heat exchanger 40 so that the temperature of the raw gas falls and the dew point temperature thereof also correspondingly falls. Thus, the condensation in the indoor blower 50 is difficult to occur.

The opening 80 may be located between the first heat exchanger unit 41 and the third heat exchanger unit 43. However, in order to improve the mixing of the air cooled by the indoor heat exchanger 40 and the raw gas introduced from the opening 80 (in this specification, this mixing is also referred to as "premix"), as seen from FIG. 1, the opening 80 is preferably located at a position farthest in distance from the indoor blower 50 (in this embodiment, between the respective upper ends of the first heat exchanger unit 41 and the second heat exchanger unit 42).

Further, referring to FIG. 1, assuming that the flowing direction of the raw gas flowing from the opening 80 to the indoor blower 50 is HG, the flowing direction of the cold air from the first heat exchanger unit 41 to the indoor blower 50 is CG1, andthe flowing direction of the cold air from the second heat exchanger unit 42 to the indoor blower 50 is CG2, the angle $\theta 1$ formed by HG and CG1 and angle $\theta 2$ formed by HG and CG2 are preferably 30° or more.

In accordance with such a configuration, the raw gas is sandwiched by the cold air. In addition, the crossing angel thereof is so large that the mixing of the raw gas with the cold air is further promoted, thereby effectively preventing the condensation of the indoor blower 50.

Next, referring to FIG. 2, an explanation will be given of the control system. The control system includes an indoor unit control section 100 and an outdoor control section 200. To the indoor unit control section 100, input signals are supplied from a remote controller, a room temperature sensor, a humidity sensor, a heat exchanger temperature sensor and a damper position detecting limit sensor (all these members are not shown), respectively.

The indoor unit control section 100 includes a remoter control signal determining segment 110, a running mode memory 120, a running status determining segment 130, a set temperature memory 140, a room temperature memory 150, an room humidity memory 160, a room temperature—set temperature comparing segment 170, a dew point temperature computing segment 180 and a damper status determining segment 190. On the basis of the respective input signals, the indoor unit control section 100 controls the damper driving motor 92 and the indoor fan motor of the indoor blower 50, and supplies a compressor control signal to the outdoor unit control section 200.

The outdoor unit control section 200 includes a running mode determining segment 210, a compressor control segment 220 and a four-way control segment 230, and on the basis of the compressor control signal supplied from the indoor unit control section 100, controls the compressor, outdoor fan motor and four-way valve.

Next, referring to FIGS. 3 and 4, an explanation will be given of a first exemplary control operation of the damper 91 for adjusting the opening rate of the opening 80. In this first exemplary control operation, the opening degree of the damper 91 is adjusted on the basis of a temperature difference (Tr–Ts) between a room temperature Tr and a set temperature Ts by the remote controller.

In this case, a temperature control zone as shown in FIG. 4 is set. A to D represent threshold values. For example, A is 4 [K], B is 2 [K], C is 3.5 [K] and D is 1.5 [K] (K represents Kelvin). Incidentally, C, D are displaced from A, B by 0.5 [K], respectively, for preventing chattering.

Referring to the flowchart of FIG. 3, when the running is started, it is determined whether the running is the heating operation or the cooling (dehumidifying) operation (step ST31) If it is the heating operation, the damper 91 is fully closed (step ST32). If it is the cooling operation, it is determined whether or not the blowing wind quantity is automatically set (step ST 33).

If the blowing wind quantity is automatically set, the room temperature Tr is monitored (step ST34A). Then, it is determined whether or not the temperature difference (Tr−Ts) between the room temperature Tr and the set temperature Ts is larger than A ((Tr−Ts)>A) (step ST35A). As a result thereof, if (Tr−Ts)>A, since the indoor heat exchanger 40 is required to have its sensible heat capability, the damper 91 is fully closed and the blowing wind quantity is set at weak wind (step ST36A). Thereafter, the control operation returns to step ST34A (Incidentally, an inequality sign ">" may be replaced by inequality sign with equality sign "≧. This applies to the following description).

If not (Tr−Ts) >A, it is determined whether or not (Tr−Ts)>B (step ST37A). As a result thereof, if (Tr−Ts)>B, the damper 91 is partly opened to change the rate of the sensible heat/latent heat in the indoor heat exchanger 40. In addition, the blowing wind quantity is set at gentle wind (step ST38A) Thereafter, the control operation returns to step ST34A.

If not (Tr−Ts)>B, the damper 91 is fully opened to enhance the latent heat capability of the indoor heat exchanger 40. In addition, the blowing wind quantity is set at quietness (step ST39A). Thereafter, the control operation returns to step ST34A.

On the other hand, in the above step ST33, if the blowing wind quantity is not automatically set, but manually set using the remote controller, the steps ST34M to ST39M similar to the above steps ST34A to ST39A are carried out, In this case, it should be noted that the blowing wind quantity is fixed at the set wind quantity regardless of the opening/closing of the damper 91.

Additionally, when the damper 91 is opened in the above steps ST38A (ST38M) and ST39A (ST39M), it is preferable that the number of revolutions of the compressor is increased according to the opening rate of the damper 91 thereby to maintain the cooling capability.

Next, referring to FIGS. 5 and 6, an explanation will be given of a second exemplary control operation of the damper 91 for adjusting the opening rate of the opening 80. In this case, as shown in FIG. 6, the threshold value is set at e.g. humidity of 70% and humidity of 60%.

Referring to the flowchart of FIG. 5, when the running is started, it is determined whether the running is the heating operation or the cooling (dehumidifying) operation (step ST51) If it is the heating operation, the damper 91 is fully closed (step ST52). If it is the cooling operation, the room humidity RH is monitored (step ST53). Then, it is determined whether or not RH>70% (step ST54).

As a result thereof, if RH>70%, the damper 91 is fully closed (step ST55). Thereafter, the control operation returns to step ST53. If not RH>70%, it is determined whether RH>60% (step ST56). As a result thereof, if RH>60%, the damper 91 is partly opened (step ST57). Thereafter, the control operation returns to step ST53. If not RH>60%, the damper 91 is fullyopened (stepST58) andthereafter the control operation returns to step ST53.

Incidentally, for easiness of the control, the threshold value may be only 60% in such a manner that if RH>60%, the damper is fully closed whereas if not RH>60%, the damper is fully opened. In this way, this invention also includes the case where there are only two statuses of "fully closed" and "fully opened". Specifically, the status of "fully closed" corresponds to the opening degree of 0% whereas the status of "fully opened" corresponds to the opening degree of 100%. Such a case is also included in this invention as one of the manners for adjusting the opening rate of the opening. 80.

Next, referring to FIGS. 7 and 8, an explanation will be given of a third exemplary control operation of the damper 91 for adjusting the opening rate of the opening 80. In this third exemplary operation, the opening degree of the damper 91 is adjusted on the basis of a temperature difference between the dew point temperature Tw of the indoor air and the heat exchanger temperature Te of the indoor heat exchanger 40. The temperature control zone employed in this case is shown in FIG. 8. The threshold values A to D may be the same as in FIG. 4, or otherwise may be empirically determined.

Referring to the flowchart of FIG. 7, when the running is started, it is determined whether the running is the heating operation or the cooling (dehumidifying) operation (step ST71) If it is the heating operation, the damper 91 is fully closed (step ST72). If it is the cooling operation, the room temperature Tr and the room humidity RH are monitored (step ST73). Then, the dew point temperature Tw of the indoor air is computed (step ST74).

Next, the heat exchanger temperature Te is monitored (step ST75). Then, it is determined whether or not a temperature difference (Tw−Te) between the dew point temperature Tw and the heat exchanger temperature Te is larger than A ((Tw−Te)>A) (step ST76). As a result thereof, if (Tw−Te)>A, the damper 91 is fully opened step ST77 and thereafter the control operation returns to step ST73.

If not (Tw−Te)>A, next, it is determined whether or not (Tw−Te)>B. As a result thereof, if (Tw−Te)>B, the damper 91 is partly opened (step St79) and the control operation returns to step ST73. If (Tw−Te)>B, the damper 91 is fully opened (step St80) and the control operation returns to step ST73.

As described above, in accordance with this invention, the opening rate of the opening 80 for introducing the raw gas can be made adjustable by the damper.91 so that the rate of the sensible heat/latent heat of the indoor heat exchanger 40 can be optionally changed. Thus, the dehumidification capability during the cooling is enhanced so that the relative humidity under the indoor environment can be reduced. Further, by introduction of the raw gas, the temperature of the blowing air rises so that the chilling sense which was problematic during the cooling cycle running can be cancelled.

Further, the relative humidity falls so that the comfort is improved at the same set temperature. Namely, the set temperature can be raised to provide the same comfort so that power consumption can be reduced. Further, in front of the indoor blower 50, the raw gas introduced from the opening 80 and the cold air passed the indoor heat exchanger 40 are mixed so that the temperature of the raw gas falls and the dew point temperature of the raw gas also correspondingly falls. Thus, the condensation in the indoor blower 50 becomes difficult to occur.

Under the indoor condition in which the room humidity is high and condensation is likely to occur in the indoor blower 50, by closing the damper 91, condensation in the indoor blower 50 can be prevented. Further, where a difference between the room temperature and set temperature is so large as to require the sensible heat capability, by closing the damper 91, shortage in the sensible heat capability can be cancelled.

Next, referring to FIGS. 9 to 15, an explanation will be given of another embodiment of the raw gas introducing member for introducing the raw gas (indoor air or outdoor air (fresh air) into the housing 10 without passing it through the indoor heat exchanger 40.

Figure 9:
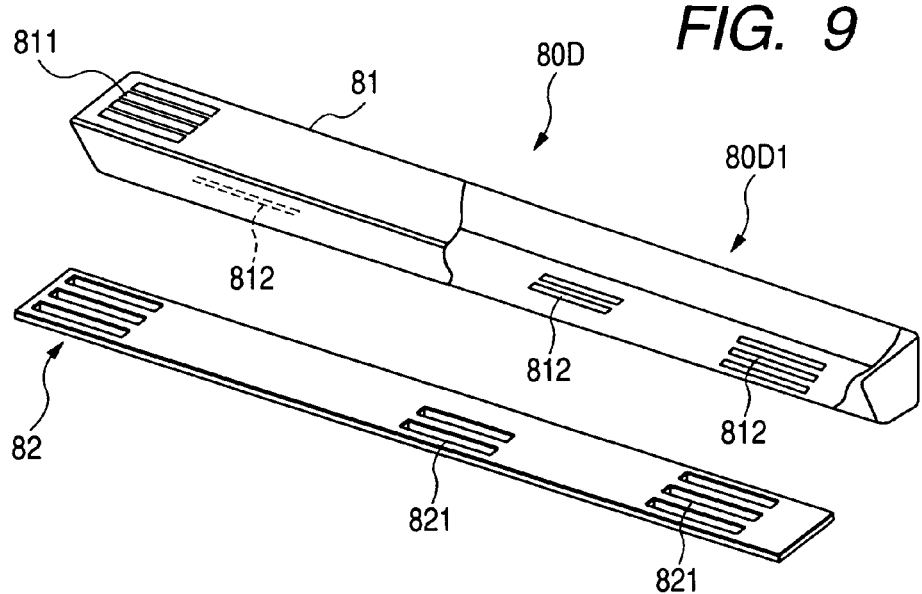
FIG. 9 is an exploded perspective view of a first example of a raw gas introducing duct.
Figure 10:
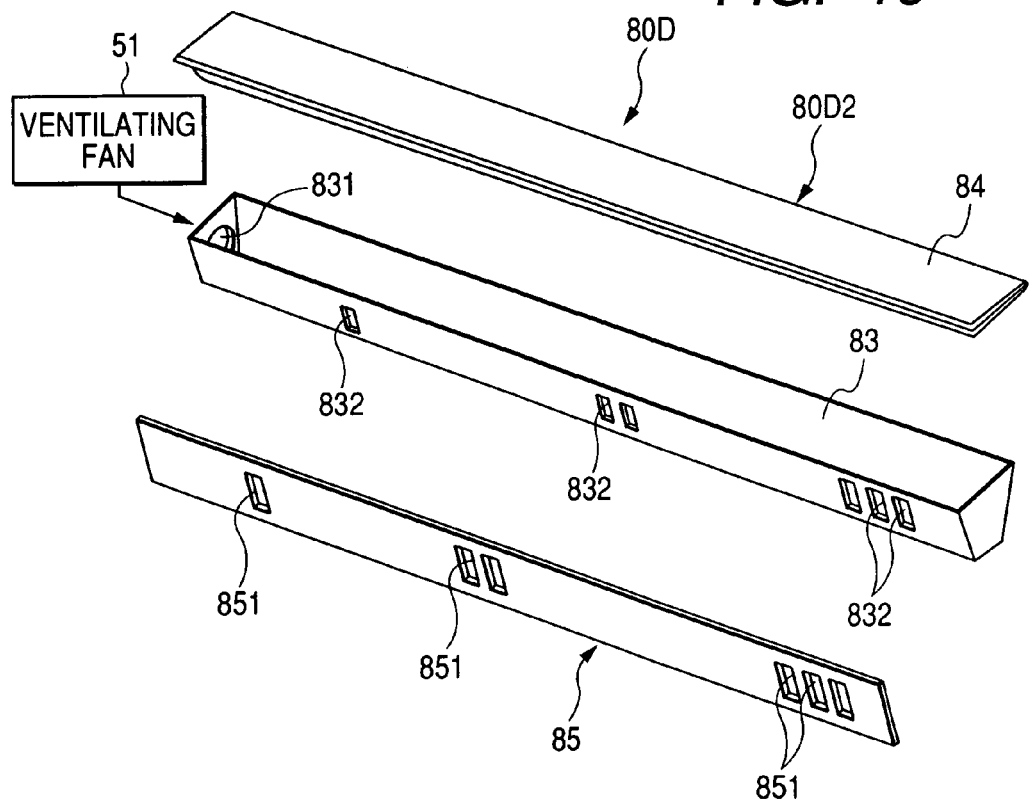
FIG. 10 is an exploded perspective view of a second example of a raw gas introducing duct.

In this embodiment, ducts 80D1, 80D2 as shown in FIGS. 9 and 10 are adopted. Incidentally, where it is not necessary to distinguish both ducts 80D1 and 80D2 therebetween, they are generally referred to as duct 80D. FIGS. 9 and 10 are exploded perspective views of the ducts 80D1 and 80D2.

The duct 80D1 shown in FIG. 9 includes a lengthy square tube 81 having e.g. a trapezoidal shape in section and a damper 82 arranged within the square tube 81. Upper surface of the square tube 81, air inlet mouths 811 for introducing the raw gas into the duct are formed as a plurality of slits.

Further, on the bottom surface of the square tube 81, air outlet mouths 812 for discharging the raw gas within the duct toward the indoor blower 50 are formed as e.g. a plurality of slits. Both ends of the square tube 81 are closed. Incidentally, the air inlet mouths 811 and the air outlet mouths 812 may be formed on different surfaces of the square tube 81.

In this embodiment, the damper 82 is formed of a lengthy shutter plate slidably arranged on the side of the bottom surface within the square tube 81. The shutter plate has a plurality of slit holes 821 corresponding to the air outlet mouths 812.

The damper 82 is driven reciprocally by a driving member such as a motor not shown between a fully-opened position where the air outlet mouths 812 and slit holes 821 agree with each other and a fully-closed position where the slit holes 821 are displaced from the air outlet mouths 812. The direction of sliding of the damper 82 may be either the longitudinal direction or the width direction thereof.

In order to prevent condensation from occurring as a result of the backward flow of air (cold air) into the duct 80D1, the damper 82 is preferably arranged on the side of the air outlet mouths 812 but may be arranged on the side of the air inlet mouths 811.

The duct 80D2 shown in FIG. 10 includes a lengthy square tube 83 having e.g. a trapezoidal shape in section, the upper surface of which is covered with a cover plate 84 and a damper 85 arranged within the square tube 83. In this duct 80D2, on the one end surface of the square tube 83, an air inlet mouth 831 for introducing the raw gas into the duct is formed. On one of the side surfaces opposite in the width direction of the square tube 83, air outlet mouths 832 are formed as e.g. a plurality of slits. Both ends of the square tube 81 are closed.

The damper 85 is formed of a lengthy shutter plate slidably arranged on the side of the air outlet mouths within the square tube 83. The shutter plate has a plurality of slit holes 851 corresponding to the air outlet mouths 832. The damper 85 is driven reciprocally by a driving member such as a motor not shown between a fully-opened position where the air outlet mouths 832 and slit holes 851 agree with each other and a fully closed position where the slit holes 821 are displaced from the air outlet mouths 832.

In this duct 80D2 also, in order to prevent condensation from occurring as a result of the backward flow of air (cold air) into the duct, the damper 85 is preferably arranged on the side of the air outlet mouths 832 but may be arranged as e.g. a damper in a flap-valve shape on the side of the air inlet mouth 831. Incidentally, like the above duct 80D1, the air outlet mouths 832 may be formed on the bottom surface of the square tube 83.

In this duct 80D2, if the air introduction mouth 831 formed at the one end is caused to face e.g. the side surface of the housing 10, the indoor air is sucked into the duct while the indoor blower 50 runs. In this case, if the air conditioner has a ventilating fan 51 for sucking the outdoor air into the room, the outdoor air can also be introduced into the duct through this ventilating fan 51.

Figure 11:
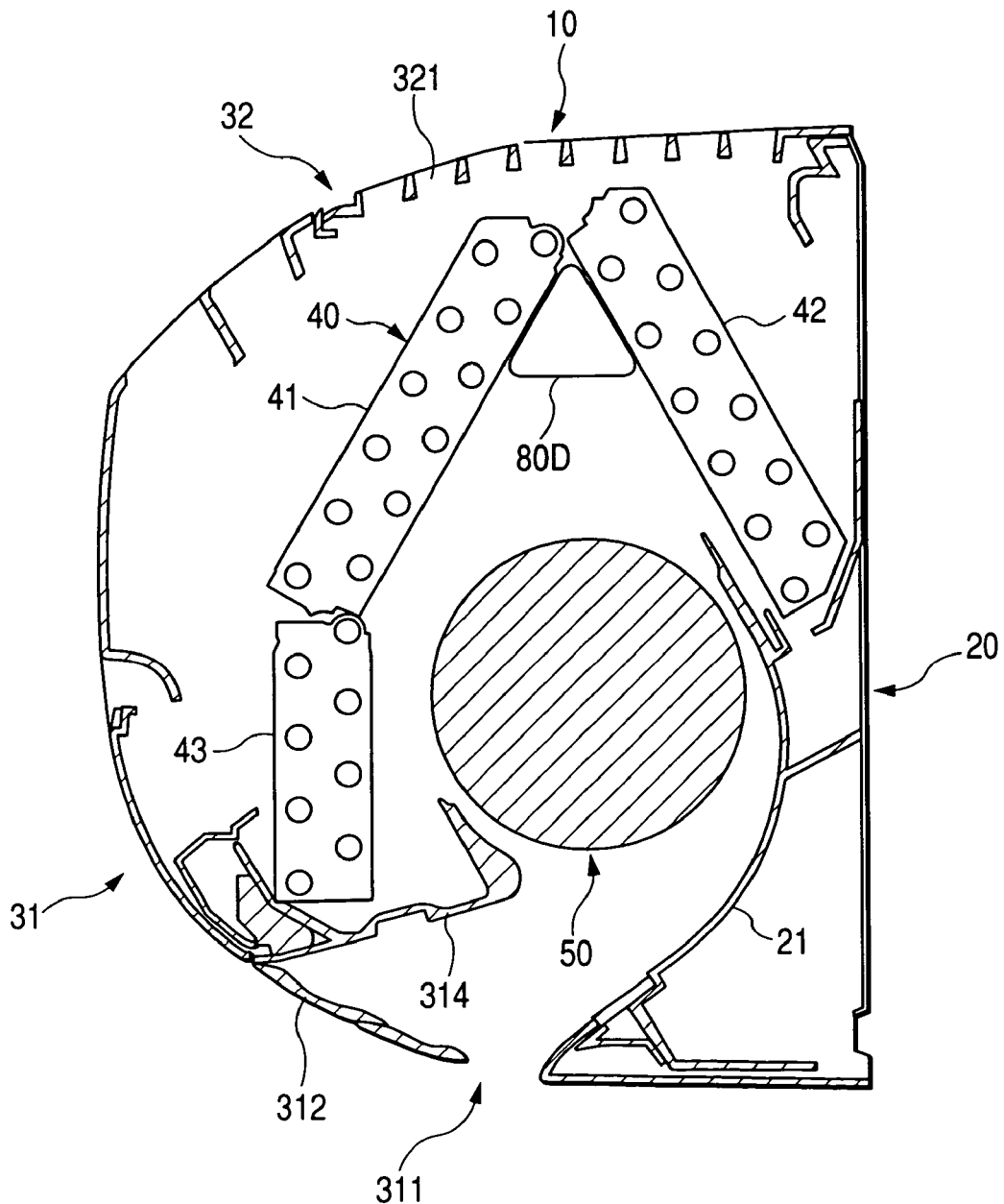
FIG. 11 is a sectional view of a first exemplary arrangement of the duct within a housing.
Figure 12:
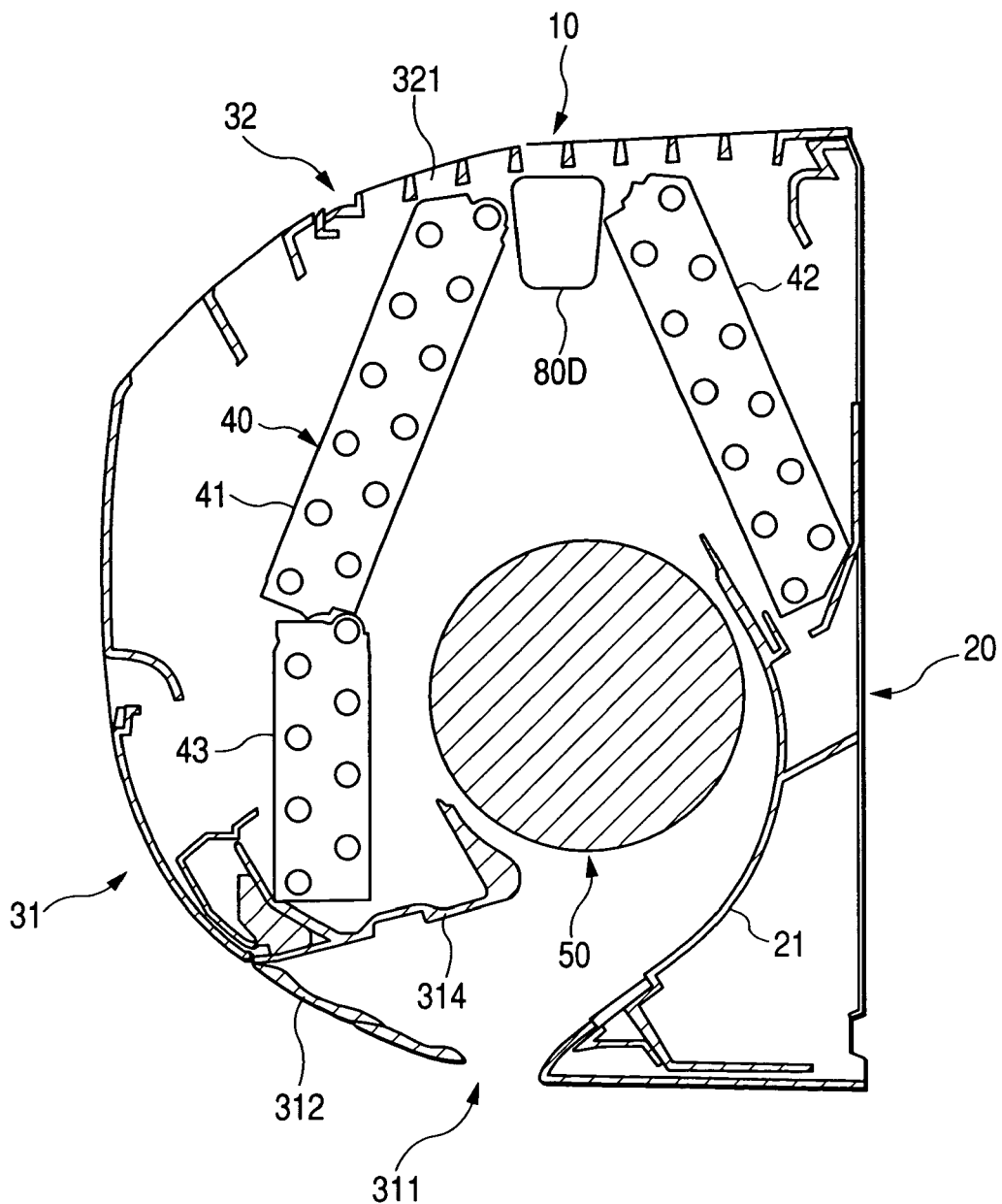
FIG. 12 is a sectional view of a second exemplary arrangement of the duct within a housing.

The above duct 80D, as seen from e.g. FIG. 11, can be arranged in a triangular tubular shape in section along the inside of the portion connecting the upper ends of the first indoor heat exchanger 41 on the front side and the second indoor heat exchanger 42 on the rear side. Further, as seen from FIG. 12, the duct 80D can also be arranged in a gap (portion corresponding to the opening 80 in FIG. 1) formed between the upper ends of the first indoor heat exchanger 41 and the second indoor heat exchanger 42.

Figure 13:
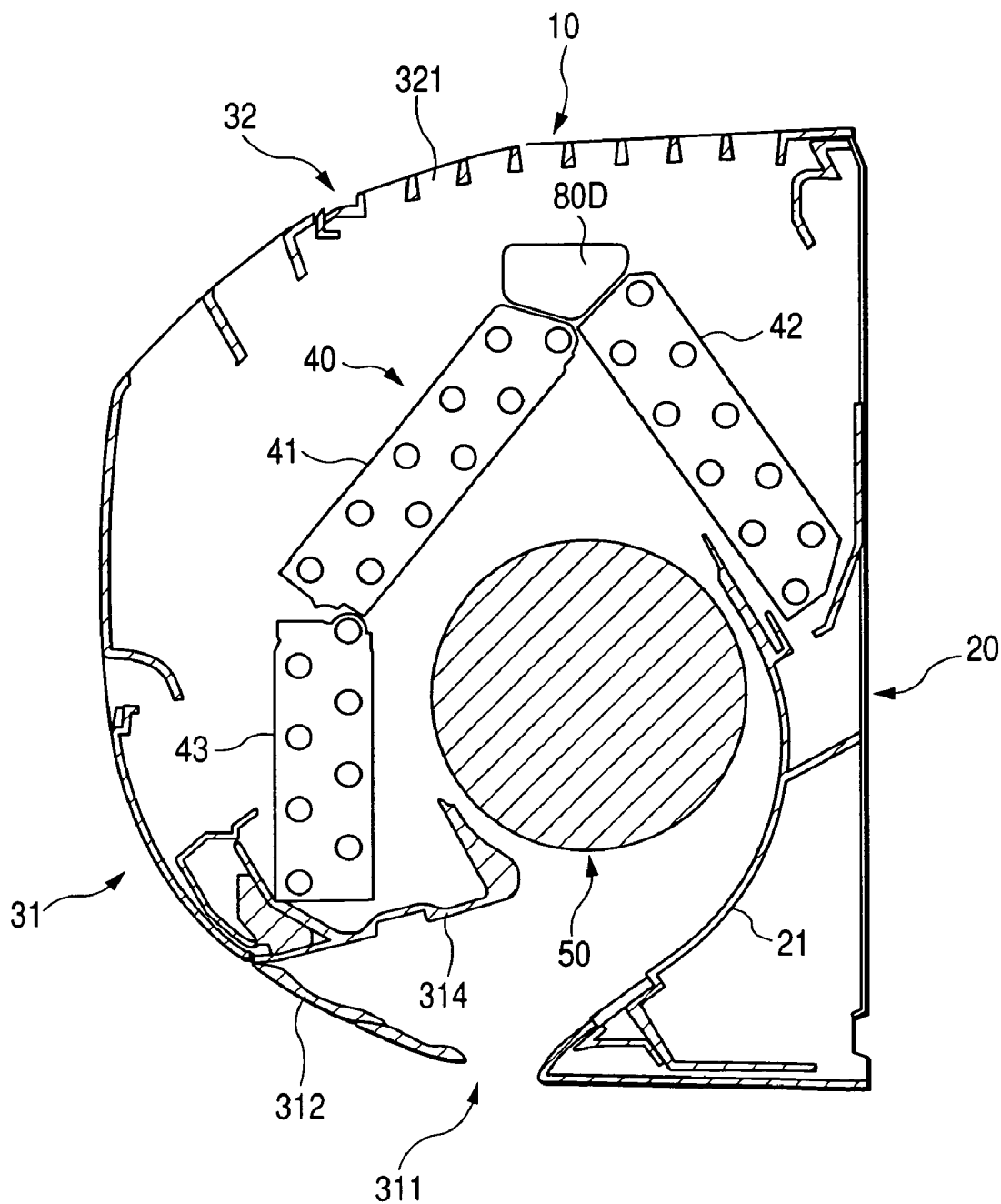
FIG. 13 is a sectional view of a third exemplary arrangement of the duct within a housing.
Figure 14:
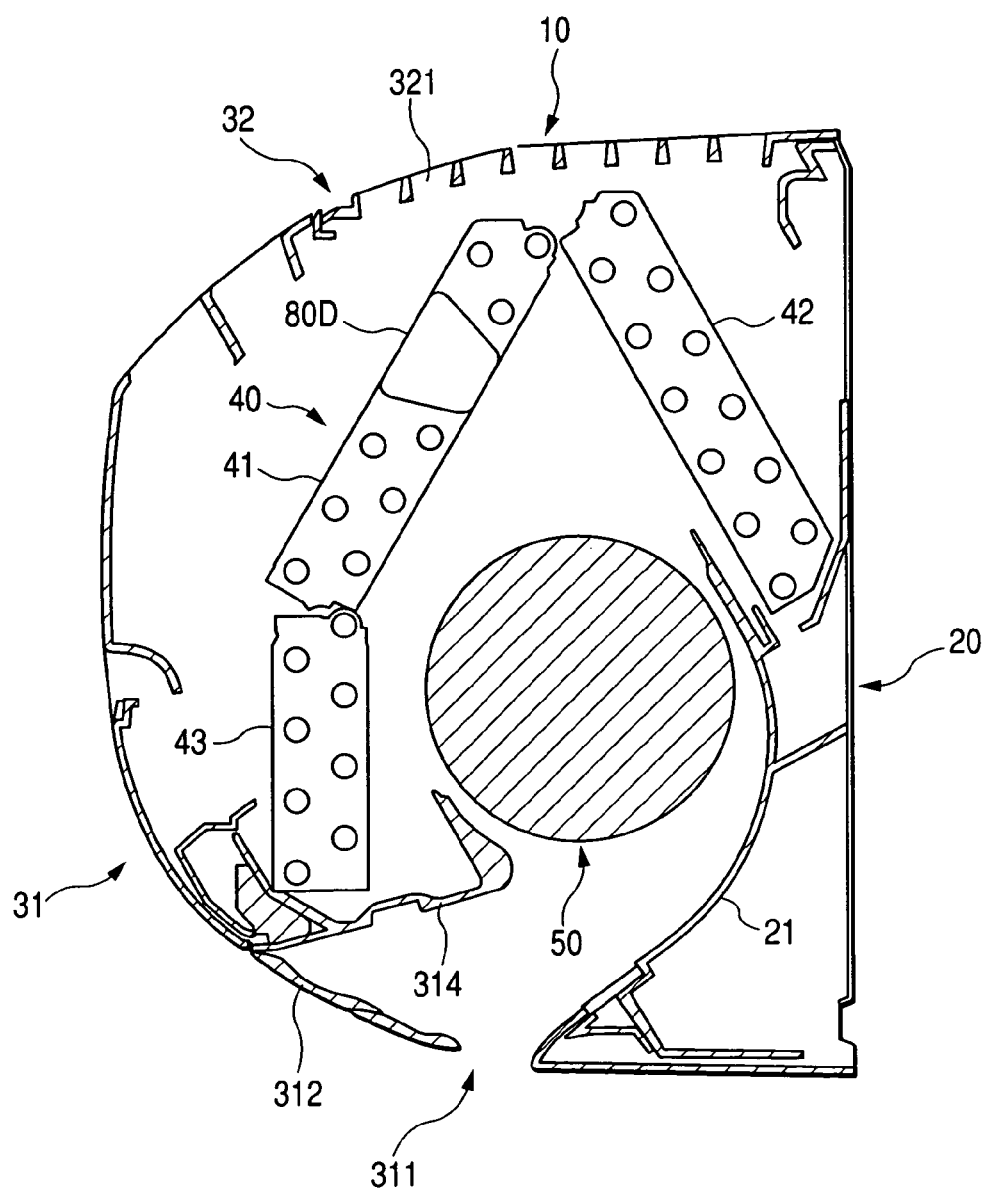
FIG. 14 is a sectional view of a fourth exemplary arrangement of the duct within a housing.
Figure 15:
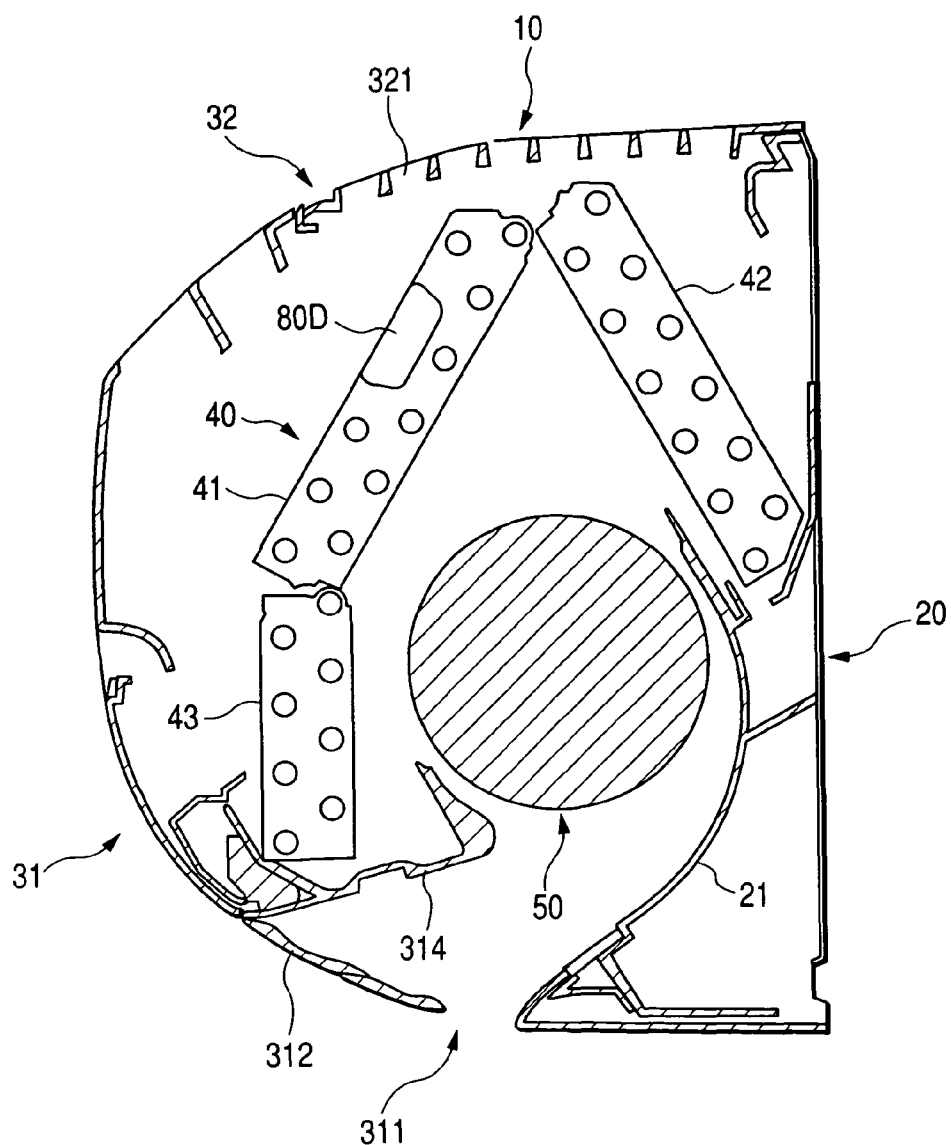
FIG. 15 is a sectional view of a fifth exemplary arrangement of the duct within a housing.

Further, as seen from FIG. 13, the duct 80D maybe arranged along the outside of the portion connecting the upper ends of the first indoor heat exchanger 41 and the second indoor heat exchanger 42. Further, the duct 80D can be arranged also within the indoor heat exchanger. In this case, as seen from FIG. 14, the duct 80D may be embedded to penetrate a group of fins of e.g. the first indoor heat exchanger 41 on the front side. Otherwise, as seen from FIG. 15, the duct 80D may be embedded in a part of the front side of the group of fins of the first indoor heat exchanger 41.

In the case of the example of FIG. 11, as the duct 80D, the duct 80D2 shown in FIG. 10 is preferably adopted. In the case of the other examples of FIGS. 12 to 15, either the duct 80D1 or the duct 80D2 maybe adopted. In either case, the length of the duct 80D is preferably ½ or more of the width in the longitudinal direction of the indoor heat exchanger so that the introduced air can be uniformly supplied toward the indoor blower 50.

Further, like the damper 91 shown in FIG. 1, the damper 82 of the duct 80D1 and the damper 85 of the duct 80D2 are drive-controlled by the controller. Incidentally, in the case of the case of the examples of FIGS. 13 and 15, the air discharged from the duct 80D passes through the heat exchanger. However, such a configuration is permitted as long as the drying capability due to the "premix" of the air conditioner is not deteriorated.

Next, an explanation will be given of the condition for opening/closing the damper 91 (inclusive of the dampers 82, 85). As described above, the opening/closing of the damper 91 is controlled with parameters of the room temperature, humidity and dewpoint temperature. In this case, if the damper 91 is opened in a state where a temperature difference between an actual room temperature Tr and a set temperature Ts set by the remote controller is large, the sensible heat capability is deteriorated thereby to lengthen the time required to reach the set temperature Ts. This may give an unpleasant feeling to a user.

Figure 16:
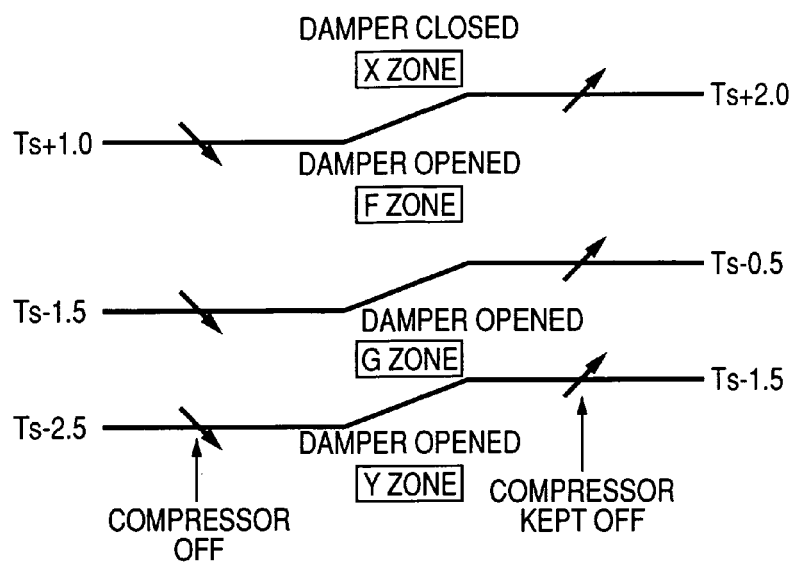
FIG. 16 is a view of a temperature zone for explaining the condition for opening/closing a damper.

So, in accordance with this invention, for example, a temperature zone as shown in FIG. 16 is so set that the damper 91 is opened when the temperature difference between the room temperature Tr and the set temperature Ts becomes small. This temperature zone is given for controlling the number of revolutions of the compressor. The temperature zone on the left side in FIG. 16 is applied to the case where the room temperature is falling. The temperature zone on the right side in FIG. 16 is applied to the case where the room temperature is rising. In order to prevent chattering, the temperature threshold values are different between when the room temperature is falling and when the room temperature is rising.

Assuming that the value in a parenthesis represents the temperature threshold value when the room temperature is rising, the zone in which the room temperature Tr is Ts+1.0° C. or more (Ts+2.0° C. or more) corresponds to X zone; the zone from Ts+1.0° C. (Ts+2.0° C.) to Ts−1.5° C. (Ts−0.5° C.) corresponds to F zone; and the zone from Ts−1.5° C. (Ts−0.5°

C.) to Ts−2.5° C. (Ts−1.5° C.) corresponds to G zone; and the zone equal to or less than Ts−2.5° C. (Ts−1.5° C.) corresponds to Y zone. With advancement of X→F→G, the number of revolutions of the compressor is lowered. In the Y zone, the compressor is placed in its stopped state.

In this example, when the room temperature is in the X zone, for example, even if the humidity is so high to require dehumidification, with the damper 91 being closed, the cooling running is carried out. When the room temperature Tr falls to shift from the X zone to the F zone, i.e. when the temperature difference between the room temperature Tr and the set temperature Ts becomes 1.0° C. or less, the damper 91 is opened.

Thus, where the temperature difference between the room temperature Tr and the set temperature Ts is large, the time required to reach the set temperature Ts can be shortened. Incidentally, in a temperature-setting priority giving mode or a "powerful mode" which is set by the remote controller, the damper may not be opened until the powerful mode is released.

The state of the damper opened is kept while the room temperature Tr is in the F zone, G zone and Y zone. On the other hand, when the room temperature starts to rise and further shifts from the F zone to the X zone, i.e. when the temperature difference between the room temperature Tr and the set temperature Ts reaches 2.0° C. or more, the damper 91 is opened.

Further, in accordance with this invention, in order to prevent the chattering of opening/closing of the damper due to fluctuation of e.g. a detected humidity value, the following countermeasure is taken. As a condition for opening the damper, the room humidity is monitored. For example, if the humidity becomes 65% or less, thereafter if the humidity of 65% or less is detected successively three times every one minute, the damper 91 is opened. In addition, once opened, the opened state is kept unconditionally for a predetermined time (e.g. five minutes).

As a condition for closing the damper, the room humidity is monitored. For example, if the humidity becomes 75% or more, thereafter if the humidity of 75% or more is detected successively three times every one minute, the damper 91 is closed.

Additionally, since the essential purpose of the "premix" is to improve the dehumidification capability, it is preferable that after the damper has been once opened, even if the condition for closing the damper is satisfied, the damper is not closed early to increase the quantity of dehumidification to the utmost, thereby enhancing comfort. On the other hand, when the damper is shifted from "closed" to "open", in order to increase the quantity of dehumidification to the utmost, it is preferable to open the damper early if the condition for opening the damper has been satisfied.

Thus, in order to make compatible between prevention of chattering of opening/closing the damper and increase in the quantity of dehumidification, the following technique can be proposed. If the damper is shifted from "open" to "closed", even if the closing condition has been satisfied, the openstate is kept for e.g. six minutes (the above three times of confirming times+three minutes). Inversely, if the damper is shifted from "closed" to "open", the closed state is kept for four minutes (the above three times of confirming times +one minute) after the opening condition has been satisfied. In this way, a time difference is preferably given between the case from "open" to "closed" and the case from "closed" to "open".

Meanwhile, when the damper 91 is opened, the ventilating resistance will be reduced. Thus, the number of revolutions of the indoor blower 50 is increased so that the quantity of wind abruptly increases and noise correspondingly becomes loud. In order to avoid this, in accordance with this invention, the following countermeasure is taken. Referring to the timing chart shown in FIG. 17, an explanation will be given of the countermeasure.

First, as a mode of controlling the number of revolutions of the indoor blower 50, assuming that the normal number of revolutions when the damper is closed is R1, the number of revolutions when the damper is opened is R2, and the number of revolutions before the damper is opened (all these numbers of revolutions are represented in terms of rpm) is R3, a relationship of R1>R2>R3 is set. For example, R3 is set at about R2—60 rpm.

With the damper being closed, when the indoor blower 50 is being operated with the normal number of revolutions R1, the damper 91 is not opened at once even if the condition of opening the damper has been satisfied. First, the number of revolutions of the indoor blower 50 is lowered from the normal number of revolutions R1 to the number of revolutions R3 before the damper is opened and masking (ignoring a damper opening signal) is done for e.g. three sec.

After three seconds elapses, the damper 91 is opened. After it is confirmed that the damper 91 has been opened, the number of revolutions of the indoor blower 50 is increased from the number of revolutions R3 before the damper is opened to the number of revolutions R2 when the damper is opened. By carrying out this control, it is possible to prevent the quantity of wind and noise from being increased when the damper 91 is opened.

Next, an explanation will be given of the control carried out in this invention when the damper 91 has caused a failure. Again referring to FIG. 1, the damper 91 is driven by the stepping motor 92 in such a manner that the open position is detected by a limit switch (not shown) and the closed position is monitored in terms of the number of revolving pulses given by the stepping motor 92.

The failure of the damper means that the damper 91 is not opened, not closed or stops on the way because of having been caught by something. Among these failures, if the cooling running is continued with the damper being opened, condensation is likely to occur within the indoor machine.

Thus, where the damper 91 has caused a failure, it is proposed to stop the running. However, since the damper 91 which is a raw gas introducing member for the air conditioner is a supplemental function for the air conditioner, if the cooling running is stopped owing to the failure of the damper, it becomes difficult to adjust the indoor environment. So, in this invention, in principle, even if failure of the damper 91 is detected, the cooling running is continued.

Further, in the opened state of the damper 91, the temperature of the indoor heat exchanger 40 is likely to fall so that the heat exchanger may generate freezing. If freezing once occurs, the condensed wall of the heat exchanger may be deposited in succession and frozen. This problem is likely to occur in particularly the air conditioner having a great cooling capability (e.g. capability of about 5 kW or 6.3 kW)

In order to avoid such inconvenience, in accordance with this invention, irrespective of the presence or absence of the failure of the damper 91, the number of revolutions of the compressor is changed between when the damper is opened and when the damper is closed. For example, when the damper is opened, the number of revolutions of the compressor is reduced by 10% as compared with that when the damper is closed, so that the temperature of the heat exchanger does not fall so greatly. Further, when the damper 91 has caused a failure, the cooling running is executed with the number of revolutions of the compressor when the damper is opened.

Figure 18A:
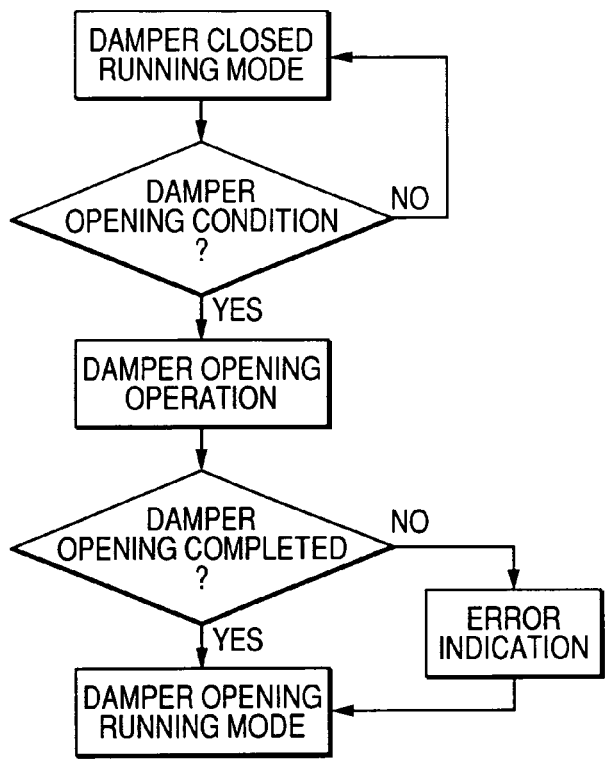
FIGS. 18A and 18B are flowcharts for explaining the running mode when the damper causes a failure.

Referring to the flowchart shown in FIG. 18, such a control will be explained. FIG. 18A is a flowchart when the running is shifted from the damper closed running to the damper opened running. When the damper opening condition is satisfied, the damper is opened. In this case, if the damper 91 is opened with no trouble, with the number of revolutions of the compressor being lower than that when the damper is closed, the running is shifted to the damper opened running.

However, if opening of the damper is not confirmed, for example, the LED (not shown) accommodated in the console box 70 is caused to light up or blink to indicate an error, and the running is shifted to the damper opened running. Namely, the number of revolutions of the compressor is made lower than that when the damper is closed.

Figure 18B:
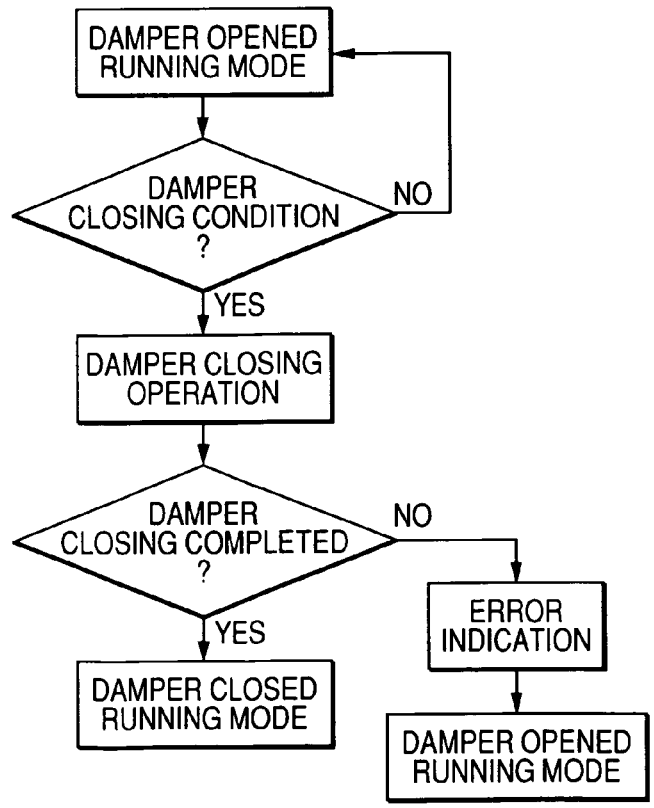

FIG. 18B is a flowchart when the running is shifted from the damper opened running to the damper closed running. When the damper closing condition is.satisfied, the damper 91 is closed. In this case, if the damper 91 is closed with no trouble, with the number of revolutions of the compressor being higher than that when the damper is opened, the running is shifted to the damper closed running.

However, if closing of the damper is not confirmed, for example, the LED (not shown) accommodated in the console box 70 is caused to light up or blink to indicate an error, and with the number of revolutions of the compressor being lower than that when the damper is closed, the damper opened running is executed.

In this way, when damper has caused a failure, the number of revolutions of the compressor is reduced to attenuate the cooling capability, thereby placing the interior of the indoor unit in an environment difficult to generate condensation. Incidentally, in order that the temperature of the heat exchanger is not lowered so largely, it is desired to reduce the number of revolutions of the compressor, and also increase that of the indoor blower 50 and reduce that of the outdoor blower.

Additionally, in the case of the air conditioner of the class e.g. 2.8 kW having a relatively low cooling capability, even if the damper is opened, the temperature of the indoor heat exchanger does not fall so greatly. For this reason, it is not necessary to change the number of revolutions of the compressor between when the damper is opened and when the damper is closed, but also when the damper is opened, permitted to keep the number of revolutions when the damper is closed.

In this invention, the raw gas is introduced from the opening 80 in FIG. 1 or the duct 80D in FIGS. 9, 10 into the housing 10. In this case, in order that the indoor blower 50 does not generate condensation owing to the raw gas (warm air), the raw gas must be sufficiently cooled by the air (cold air) passed through the indoor heat exchanger 40 on the upstream side of the indoor heat exchanger 50. Incidentally, in this explanation, the opening 80 and the duct 80D are referred to as raw gas introducing portions 80 and 80D, respectively.

Figure 19A:
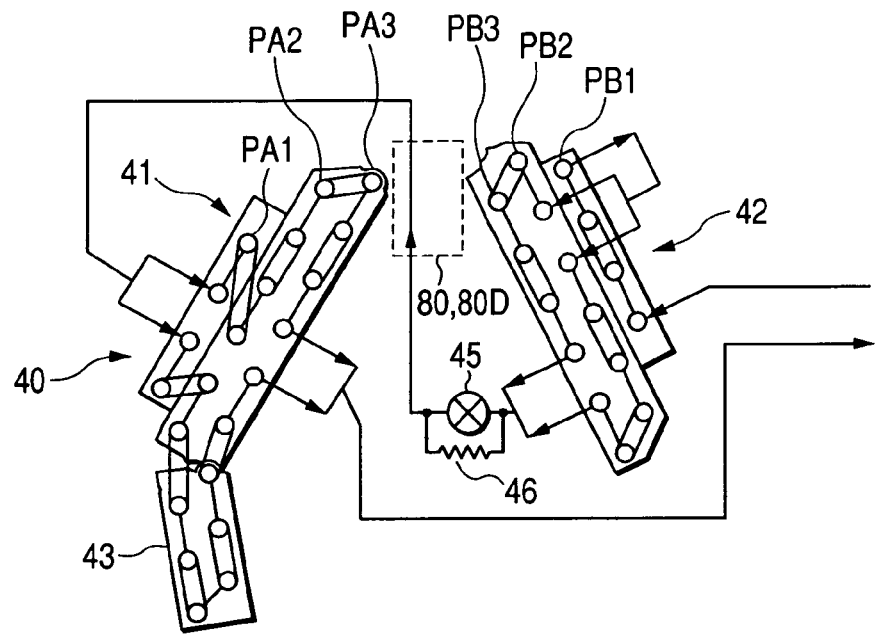
FIGS. 19A and 19B are schematic views of a coolant flow path of a heat exchanger for effectively cooling a raw gas.

For the above reason, in this invention, in view of a relationship with a coolant flow passage of the coolant passed through the indoor heat exchanger 40, the raw gas is effectively mixed with the air passed through the indoor heat exchanger 40 so that it is sufficiently cooled. Its basic configuration is to locate the raw gas introducing portion 80, 80D on the downstream side of the coolant flow passage and pass the coolant from the upstream side in an air flowing direction of the coolant flow passage. Further, by branching the coolant circuit into a plurality of paths to reduce the pressure of the coolant, the temperature of the coolant can be lowered. Referring to FIG. 19A, an example thereof will be explained.

FIG. 19A is a schematic view of the coolant flow passage (coolant piping) of the indoor heat exchanger 40. The first indoor heat exchanger 41 and the second indoor heat exchanger 42 are connected to each other through a parallel circuit including an open/close valve 45 for re-heating/dehumidification and a capillary tube 46. Although the coolant is passed from the second indoor heat exchanger 42 to the first indoor heat exchanger, the open/close valve 45 and capillary tube 46 may be omitted.

As seen from FIG. 19A, where the raw gas introducing portion 80, 80D is located between the upper ends of the first indoor heat exchanger 41 and the second indoor heat exchanger 42 and each indoor heat exchanger 41, 42 has e.g. three columns of coolant flow passages, assuming that the coolant flow passage of the column nearest to the raw gas introducing portion 80, 80D is PA3, PB3; the coolant flow passage of the column on the outside thereof is PA2, PB2; and the coolant flow passage of the column on the further outside thereof is PA1, PB1, in the second indoor heat exchanger 42, the coolant is passed from the coolant flow passage PB1 toward the coolant flow passage PB3. Likewise, in the first indoor heat exchanger 41 also, the coolant is passed from the coolant flow passage PA1 toward the coolant flow passage PA3.

As described above, in the air flowing direction, the coolant flow passage PA1, PB1 is set at the upstream side whereas the coolant flow passage PA3, PB3 nearest to the raw gas introducing portion 80, 80D is set at the downstream side. Generally, since the pressure of the coolant is gradually reduced owing to loss by the resistance of the flow passage, the temperature of the coolant becomes lower at the position nearer to the outlet of the coolant flow passage.

Thus, since the temperature of the air passing through the heat exchanger continuously falls from the upstream side toward the downstream side, as described above, by setting the coolant flow passage PA3, PB3 nearest to the raw gas introducing portion 80, 80D at the downstream side, before the indoorblower 50, the raw gas introduced into the housing 10 can be sufficiently cooled to the degree not generating condensation.

Figure 19B:
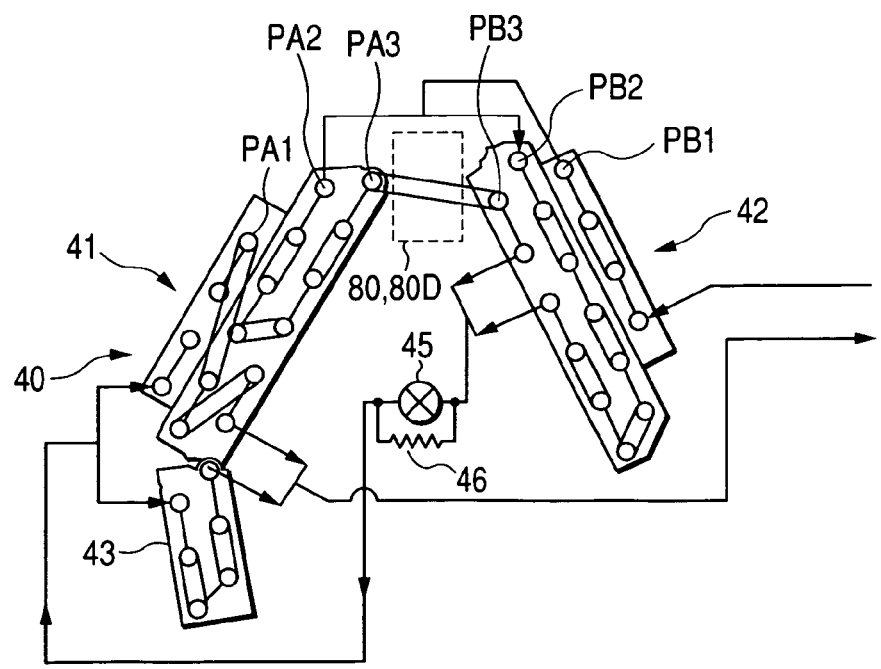

More preferably, as seen from FIG. 19B, the coolant flow passages PA3, PB3 on the downstream side of the indoor heat exchangers 41, 42 are connected to each other thereby to make a single coolant flow passage straddling the raw gas introducing portion 80, 80D. In accordance with such a configuration, the raw gas introduced is nearly uniformly cooled by the coolant flow passage PA3 on the downstream side of the first indoor heat exchanger 41 and the coolant flow passage PB3 on the downstream side of the second indoor heat exchanger 42 so that changes in the temperature can be further reduced. Further, even if balance of the quantity of the flowing coolant is lost owing to mixing of an alien substance into the other coolant path, since the raw gas introduced is cooled by the single coolant flow passage, changes in the cooling temperature can be further reduced.

Figure 20A:
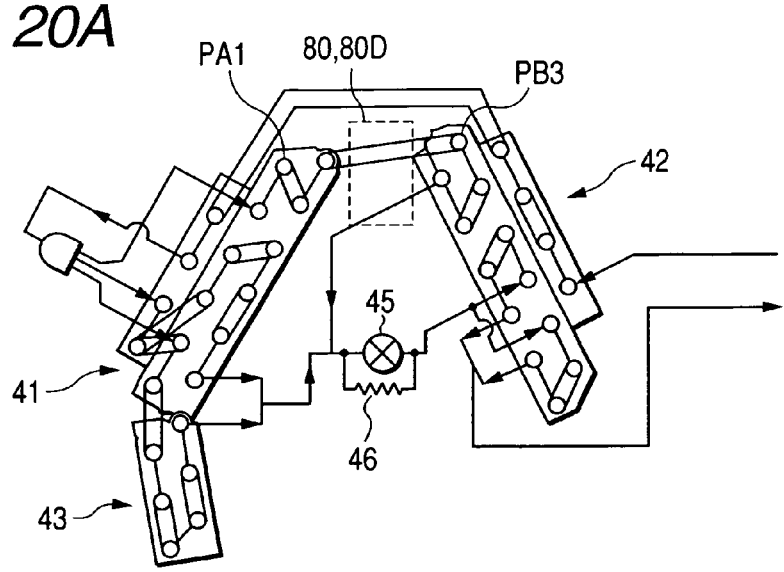
FIGS. 20A and 20B are schematic views of another coolant flow path of a heat exchanger for effectively cooling a raw gas.

Further, as seen from FIG. 20A, at the portion straddling the raw gas introducing portion 80, 80D, the upstream coolant flow passage PA1 of the first indoor heat exchanger 41 may be connected to the downstream coolant flow passage PB3 of the second indoor heat exchanger 42.

Figure 20B:
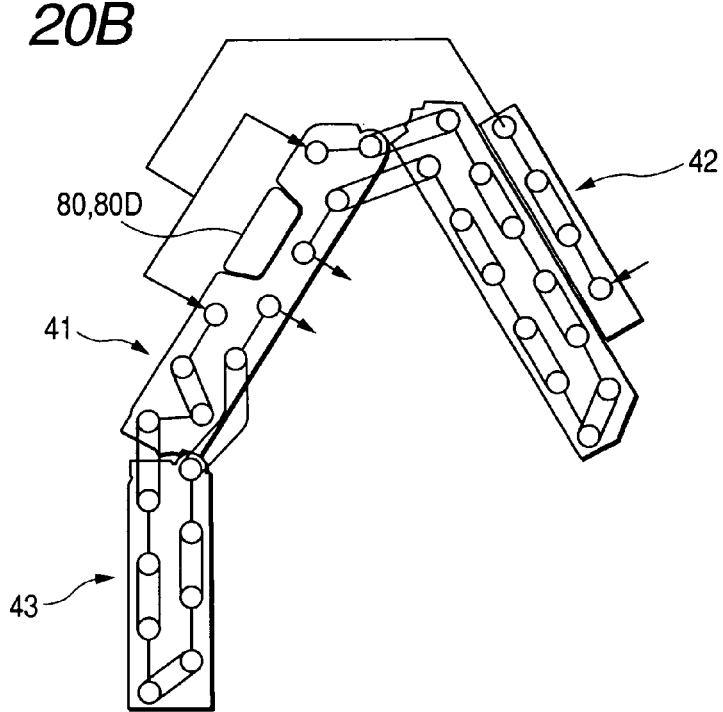

Further, as seen from FIG. 20B, where the raw gas introducing portion 80, 80D.is embedded in e.g. a group of fins of the first indoor heat exchanger 41 and the coolant flow passage in the vicinity thereof is constructed of a plurality of paths, by locating the coolant outlet in each path on the side of the raw gas introducing portion 80, 80D, the raw gas introduced can be supplied into the room without being excessively cooled so that the room temperature is not excessively reduced.

[FIG. 2]
A1: remote controller signal
A2: room temperature sensor
A3: humidity sensor
A4: heat exchanger sensor
A5: damper position detecting limit switch
A6: compressor
A7: outdoor fan motor
A8: four-way valve
50: indoor fan motor
91: damper driving ST motor
100: indoor unit control section
110: remoter control signal determining segment
120: running mode memory segment
130: running status determining segment
140: set temperature memory
150: room temperature memory segment
160: room humidity memory segment
170: room temperature vs set temperature comparing segment
180: dew point temperature computing segment
190: damper status determining segment
200: outdoor unit control section
210: running mode determining segment
220: compressor control segment
230: four-way valve control segment

[FIG. 3]
A1: running start
A2: heating
A3: cooling
ST31: cooling or heating running ?
ST32: damper opened
ST34: room temperature monitored
ST35A: present room temperature−set temperature>A ?
ST36A: damper fully closed, wind quantity: weak
ST37A: present room temperature−set temperature>B ?
ST38A: damper partly opened, wind quantity: gentle
ST39A: damper fully opened, wind quantity: quiet
ST33: wind quantity automatically set ?
ST34M: room temperature monitored
ST35M: present room temperature−set temperature>A ?
ST36M: damper fully closed, wind quantity: set
ST37M: present room temperature−set temperature>B ?
ST38M: damper partly opened, wind quantity: set
ST39M: damper fully opened, wind quantity: set

[FIG. 4]
A1: wind quantity
A2: weak
A3: gentle
A4: quiet
A5: damper
A6: fully closed
A7: partly opened
A8: fully opened

[FIG. 5]
A1: running starts
A2: heating
A3: cooling
ST51: cooling or heating running ?
ST52: damper closed
ST53: room temperature monitored
ST54: room humidity>70% ?
ST55: damper fully closed ST56: room humidity>60% ?
ST57: damper partly opened
ST58: damper fully opened

[FIG. 6]
A1: damper
A2: fully closed
A3: partly opened
A4: fully opened

[FIG. 7]
A1: running starts
A2: heating
A3: cooling
ST71: cooling or heating running ?
ST72: damper closed
ST73: room temperature monitored, room humidity monitored
ST74: indoor air dew point temperature computed
ST75: indoor heat-exchanger temperature monitored
ST76: (indoor air dew point temperature−indoor heat-exchanger temperature)>A
ST77: damper fully closed
ST78: (indoor air dew point temperature−indoor heat-exchanger temperature)>B
ST79: damper partly opened
ST80: damper fully opened

[FIG. 8]
A1: damper
A2: fully closed
A3: partly opened
A4: fully opened

[FIG. 10]
51: ventilating fan

[FIG. 16]
A1: damper closed
A2: X zone
A3: damper opened
A4: F zone
A5: G zone
A6: Y zone
A7: compressor OFF
A8: compressor kept OFF

Figure 17:
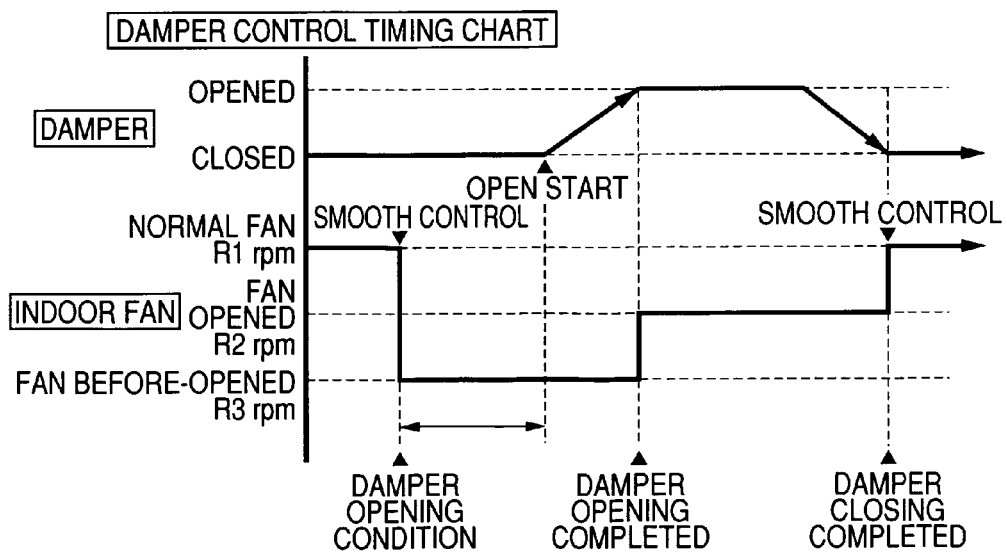
FIG. 17 is a timing chart for explaining the operation when the damper is opened.

[FIG. 17]
A1: damper control timing chart
A2: damper
A3: indoor fan
A4: opened,
A5: closed
A6: open start
A7: normal fan
A8: smooth control
A9: smooth control
A10: fan opened
A11: fan before-opened
A12: damper opening condition
A13: damper opening completed
A14: damper closing completed

[FIG. 18A]
A1: damper closed running mode
A2: damper opening condition ?
A3: damper opening operation
A4: damper opening completed
A5: damper opened running mode
A6: error indication

[FIG. 18B]
A1: damper opened running mode
A2: damper closing condition ?
A3: damper closing operation A4: damper closing completed
A5: damper closed running mode
A6: error indication
A7: damper opened running mode

What is claimed is:

1. An air conditioner comprising:
a housing having an air inlet and an air outlet;
an indoor heat exchanger arranged on the side of the air inlet within an air passage connecting the air inlet and the air outlet in the housing;
an indoor blower arranged on the side of the air outlet within the air passage;
an outdoor blower;
a controller for controlling a freezing cycle, the freezing cycle including at least the indoor heat exchanger, a compressor, a flow rate adjuster, and the indoor blower, wherein the indoor heat exchanger includes at least a first heat exchanger and a second heat exchanger and an introducing member for introducing the indoor air sucked from the air inlet into the indoor blower without passing through the first heat exchanger and the second heat exchanger, the introducing member being located between the first heat exchanger and the second heat exchanger; and
the controller, during a cooling cycle running of the freezing cycle, controls at least one of the quantity of air introduced from the introducing member, the indoor blower, or the freezing cycle to maintain the temperature of the indoor heat exchanger lower than a dew point temperature of the indoor air.

2. The air conditioner according to claim 1, wherein the introducing member includes:
an opening located between the first heat exchanger and the second heat exchanger; and
a damper for adjusting the opening rate of the opening which is driven by a predetermined driving member.

3. The air conditioner according to claim 2, wherein when the opening rate of the opening is increased by the damper, the controller increases the number of revolutions of the compressor included in the freezing cycle according to a predetermined condition.

4. The air conditioner according to claim 2, further comprising:
a temperature sensor for detecting a room temperature Tr, wherein the controller drives the damper by the driving member according to a temperature difference (Tr−Ts) between the room temperature Tr and a set temperature Ts to adjust the opening rate of the opening.

5. The air conditioner according to claim 4, wherein a plurality of threshold values are set for the temperature difference (Tr−Ts) and the damper is driven by the driving member on the basis of a value relationship between the temperature difference (Tr−Ts) and each of the threshold values to adjust the opening rate of the opening.

6. The air conditioner according to claim 2, further comprising:
a humidity sensor for detecting humidity RH of the indoor air, wherein the controller drives the damper by the driving member according to the humidity RH to adjust the opening rate of the opening.

7. The air conditioner according to claim 6, wherein a plurality of threshold values are set for the humidity RH and the damper is driven by the driving member on the basis of a value relationship between the humidity RH and each of the threshold values to adjust the opening rate of the opening.

8. The air conditioner according to claim 2, further comprising:
a first temperature sensor for detecting a room temperature Tr;
a humidity sensor for detecting humidity RH of the indoor air; and
a second temperature sensor for detecting a temperature Te of the indoor heat exchanger, wherein the controller computes a dew point temperature Tw from the room temperature Tr and the humidity RH, and drives the damper by the driving member according to a temperature difference (Tw−Te) between the dew point temperature Tw and the temperature Te of the indoor heat exchanger to adjust the opening rate of the opening.

9. The air conditioner according to claim 8, wherein a plurality of threshold values are set for the temperature difference (Tw−Te), and the damper is driven by the driving member on the basis of a value relationship between the temperature difference (Tw−Te) and each of the threshold values to adjust the opening rate of the opening in multiple stages.

10. The air conditioner according to claim 1, wherein the introducing member includes:
a duct having an air inlet mouth for directly introducing the indoor air and/or outdoor air without being passed through the indoor heat exchanger, and an air outlet mouth for discharging the air introduced from the air inlet mouth toward the indoor blower; and
a damper for adjusting the air flow rate within the duct.

11. The air conditioner according to claim 10, wherein when the opening rate of the opening is increased by the damper, the controller increases the number of revolutions of the compressor included in the freezing cycle according to a predetermined condition.

12. The air conditioner according to claim 10, further comprising:
a temperature sensor for detecting a room temperature Tr, wherein the controller drives the damper by the driving member according to a temperature difference (Tr−Ts) between the room temperature Tr and a set temperature Ts to adjust the opening rate of the opening.

13. The air conditioner according to claim 12, wherein a plurality of threshold values are set for the temperature difference (Tr−Ts) and the damper is driven by the driving member on the basis of a value relationship between the temperature difference (Tr−Ts) and each of the threshold values to adjust the opening rate of the opening.

14. The air conditioner according to claim 10, further comprising:
a humidity sensor for detecting humidity RH of the indoor air, wherein the controller drives the damper by the driving member according to the humidity RH to adjust the opening rate of the opening.

15. The air conditioner according to claim 14, wherein a plurality of threshold values are set for the humidity RH and the damper is driven by the driving member on the basis of a value relationship between the humidity RH and each of the threshold values to adjust the opening rate of the opening.

16. The air conditioner according to claim 10, further comprising:
a first temperature sensor for detecting a room temperature Tr;
a humidity sensor for detecting humidity RH of the indoor air; and
a second temperature sensor for detecting a temperature Te of the indoor heat exchanger, wherein the controller computes a dew point temperature Tw from the room temperature Tr and the humidity RH, and drives the damper by the driving member according to a temperature difference (Tw−Te) between the dew point temperature Tw and the temperature Te of the indoor heat exchanger to adjust the opening rate of the opening.

17. The air conditioner according to claim 16, wherein a plurality of threshold values are set for the temperature difference (Tw−Te), and the damper is driven by the driving member on the basis of a value relationship between the temperature difference (Tw−Te) and each of the threshold values to adjust the opening rate of the opening in multiple stages.

18. The air conditioner according to claim 1, wherein the first and the second heat exchangers are arranged along the periphery on the side of the air inlet of the indoor blower, and the introducing member is arranged at a position farthest in distance from the indoor blower.

19. The air conditioner according to claim 1, wherein the air flow passing the first and the second heat exchanger to reach the indoor blower, and the air flow passing the introducing member to reach the indoor blower cross at an angle of 30° or more.

20. An air conditioner comprising:
a housing having an air inlet and an air outlet;
an indoor heat exchanger arranged on the side of the air inlet within an air passage connecting the air inlet and the air outlet in the housing;
an indoor blower arranged on the side of the air outlet within the air passage;
an outdoor blower;
a controller for controlling a freezing cycle, the freezing cycle including at least the indoor heat exchanger, a compressor, a flow rate adjuster, and the indoor blower;
a duct provided within the housing, the duct having an air inlet mouth for directly introducing the indoor air and/or outdoor air without being passed through the indoor heat exchanger and an air outlet mouth for discharging the air introduced from the air inlet mouth toward the indoor blower; and
a damper for adjusting the opening rate of at least one of the air inlet mouth or the air outlet mouth, wherein the opening rate is controlled by the controller, wherein during a cooling cycle running of the freezing cycle, the controller controls at least one of the opening rate, the indoor blower, or the freezing cycle to maintain the temperature of the indoor heat exchanger lower than a dew point temperature of the indoor air.

21. The air conditioner according to claim 20, wherein when the opening rate of at least one of the air inlet mouth or the air outlet mouth is increased by the damper, the controller increases the number of revolutions of the compressor included in the freezing cycle according to a predetermined condition.

22. The air conditioner according to claim 20, further comprising:
a temperature sensor for detecting a room temperature Tr, wherein the controller drives the damper by the driving member according to a temperature difference (Tr−Ts) between the room temperature Tr and a set temperature Ts to adjust the opening rate of at least one of the air inlet mouth or the air outlet mouth.

23. The air conditioner according to claim 22, wherein a plurality of threshold values are set for the temperature difference (Tr−Ts) and the damper is driven by the driving member on the basis of a value relationship between the temperature difference (Tr−Ts) and each of the threshold values to adjust the opening rate of at least one of the air inlet mouth or the air outlet mouth.

24. The air conditioner according to claim 20, further comprising:
a humidity sensor for detecting humidity RH of the indoor air, wherein the controller drives the damper by the driving member according to the humidity RH to adjust the opening rate of at least one of the air inlet mouth or the air outlet mouth.

25. The air conditioner according to claim 24, wherein a plurality of threshold values are set for the humidity RH and the damper is driven by the driving member on the basis of a value relationship between the humidity RH and each of the threshold values to adjust the opening rate of at least one of the air inlet mouth or the air outlet mouth.

26. The air conditioner according to claim 20, further comprising:
a first temperature sensor for detecting a room temperature Tr;
a humidity sensor for detecting humidity RH of the indoor air; and
a second temperature sensor for detecting a temperature Te of the indoor heat exchanger, wherein the controller computes a dew point temperature Tw from the room temperature Tr and the humidity RH, and drives the damper by the driving member according to a temperature difference (Tw−Te) between the dew point temperature Tw and the temperature Te of the indoor heat exchanger to adjust the opening rate of at least one of the air inlet mouth or the air outlet mouth.

27. The air conditioner according to claim 26, wherein a plurality of threshold values are set for the temperature difference (Tw−Te), and the damper is driven by the driving member on the basis of a value relationship between the temperature difference (Tw−Te) and each of the threshold values to adjust the opening rate of at least one of the air inlet mouth or the air outlet mouth in multiple stages.

28. An air conditioner comprising:
a housing having an air inlet and an air outlet;
an indoor heat exchanger arranged on the side of the air inlet within an air passage connecting the air inlet and the air outlet in the housing;
an indoor blower arranged on the side of the air outlet within the air passage;
a controller for controlling a freezing cycle, the freezing cycle including at least the indoor heat exchanger and the indoor blower;
a raw gas introducing portion for introducing a raw gas of indoor air and/or outdoor air into the indoor blower without passing through the indoor heat exchanger; and
a damper for opening/closing the raw gas introducing portion, the damper adapted to shift between an "opened" position and a "closed" position under the control of the controller during a cooling cycle running of the freezing cycle,
wherein the controller is adapted to shift the damper from the "opened" position to the "closed" position and vice versa as a result of the controller detecting a prescribed damper opening condition or damper closing condition, and the controller unconditionally keeps the damper in the "opened" position or the "closed" position for a subsequent predetermined time after the respective damper opening condition or damper closing condition is detected.

29. An air conditioner comprising:
a housing having an air inlet and an air outlet;
an indoor heat exchanger arranged on the side of the air inlet within an air passage connecting the air inlet and the air outlet in the housing;

an indoor blower arranged on the side of the air outlet within the air passage;

a controller for controlling a freezing cycle, the freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion, the damper adapted to shift between an "opened" position and a "closed" position under the control of the controller during a cooling cycle running of the freezing cycle, wherein when the controller detects a damper opening condition or a damper closing condition multiple times in succession over a predetermined time interval, the controller places the damper in the "opened" position or the "closed" position, respectively.

30. An air conditioner comprising:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle, the freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion, the damper adapted to shift between an "opened" position and a "closed" position under the control of the controller during a cooling cycle running of the freezing cycle, wherein the controller has a temperature-setting priority mode in which the air conditioner causes a room temperature to arrive at a set temperature precedently to reducing humidity, and the controller keeps the damper in a closed status during the temperature-setting priority mode.

31. The air conditioner according to claim 30, wherein the temperature-setting priority mode is set by a remote controller.

32. An air conditioner comprising:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle, the freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion, the damper adapted to shift between an "opened" position and a "closed" position under the control of the controller during a cooling cycle running of the freezing cycle, wherein the controller is adapted to reduce the number of revolutions of the indoor blower when the controller shifts the damper from the "closed position" to the "opened" position.

33. An air conditioner comprising:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle, the freezing cycle including at least the indoor heat exchanger and the indoor blower;

a raw gas introducing portion for introducing a raw gas of indoor air and/or outdoor air into the indoor blower without passing through the indoor heat exchanger; and a damper for opening/closing the raw gas introducing portion, the damper adapted to shift between an "opened" position and a "closed" position under the control of the controller during a cooling cycle running of the freezing cycle, wherein the controller has at least three modes of the number of revolutions of the indoor blower, including the number of revolutions R1 when the damper is closed, the number of revolutions R2 when the damper is opened, and the number of revolutions R3 before the damper is opened, wherein R1>R2>R3, and when the controller detects a prescribed opening condition for the damper the controller executes:

a first step of changing the number of revolutions of the indoor blower from R1 to R3;

a second step of keeping the number of revolutions R3 for a predetermined time;

a third step of placing the damper in the "opened" position after the second step; and a fourth step of changing the number of revolutions of the indoor blower from R3 to R2, when the damper comes to the "opened" position.

34. An air conditioner comprising:

a housing having an air inlet and an air outlet;

an indoor heat exchanger arranged on the side of the air inlet within an air passage connecting the air inlet and the air outlet in the housing;

an indoor blower arranged on the side of the air outlet within the air passage;

a controller for controlling a freezing cycle, the freezing cycle including at least the indoor heat exchanger, a compressor, and the indoor blower;

a raw gas introducing portion for introducing a raw gas of indoor air and/or outdoor air into the indoor blower without passing through the indoor heat exchanger; and a damper for opening/closing the raw gas introducing portion under the control of the controller during a cooling cycle running of the freezing cycle, wherein the controller is adapted to locate the damper at a set position, and the controller continues running of the cooling cycle even when the damper is not located in the set position set by the controller.

35. The air conditioner according to claim 34, wherein the controller has at least two modes of the number of revolutions of the compressor, including the number of revolutions P1 when the damper is closed and the number of revolutions P2 when the damper is opened, wherein P2 is less than or equal to P1, and when the damper is not located in the set position, the controller sets the number of revolutions of the compressor at the number of revolutions P2.

36. The air conditioner according to claim 34, wherein when the damper is not located in the set position, the controller makes an error indication by operating a predetermined noticing member.

37. An air conditioner comprising:

a housing having an air inlet and an air outlet;

an indoor heat exchanger arranged on the side of the air inlet within an air passage connecting the air inlet and the air outlet in the housing, the indoor heat exchanger including a first heat exchanger and a second heat exchanger;

an indoor blower arranged on the side of the air outlet within the air passage;

a controller for controlling a freezing cycle, the freezing cycle including at least the indoor heat exchanger and the indoor blower;

a raw gas introducing portion for introducing a raw gas of indoor air and/or outdoor air into the indoor blower without passing through the indoor heat exchanger, wherein the first heat exchanger and the second heat exchanger each include an upstream coolant flow passage and a downstream coolant flow passage located downstream from the upstream coolant flow passage with respect to air sucked through the indoor heat exchanger, and the raw gas introducing portion is arranged between the first heat exchanger and the second heat exchanger, and the downstream coolant flow passage of the first heat exchanger and the downstream coolant flow passage of the second heat exchanger are connected to each other so as to straddle the raw gas introducing portion.

* * * * *